United States Patent
Yamakawa et al.

(10) Patent No.: US 8,264,181 B2
(45) Date of Patent: Sep. 11, 2012

(54) CONTROLLER FOR MOTOR DRIVE CONTROL SYSTEM

(75) Inventors: Toshifumi Yamakawa, Okazaki (JP); Kenji Yamada, Nagoya (JP); Yutaka Kuromatsu, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 409 days.

(21) Appl. No.: 12/685,006

(22) Filed: Jan. 11, 2010

(65) Prior Publication Data

US 2010/0176757 A1    Jul. 15, 2010

(30) Foreign Application Priority Data

Jan. 9, 2009   (JP) ................. 2009-003795

(51) Int. Cl.
*H02P 7/00* (2006.01)

(52) U.S. Cl. ........ 318/432; 318/599; 318/811; 318/799; 318/434

(58) Field of Classification Search ............... 318/432, 318/560, 599, 434, 721, 779, 799, 800, 801, 318/811; 388/811, 819
See application file for complete search history.

(56) References Cited

U.S. PATENT DOCUMENTS

| | | | |
|---|---|---|---|
| 6,777,897 B2 | 8/2004 | Murai | |
| 7,893,637 B2 * | 2/2011 | Suhama et al. | 318/376 |
| 7,960,930 B2 * | 6/2011 | Sato | 318/432 |
| 2008/0035411 A1 * | 2/2008 | Yamashita et al. | 180/443 |

FOREIGN PATENT DOCUMENTS

| | | | |
|---|---|---|---|
| JP | 11146501 | A | 5/1999 |
| JP | 11146501 | A | 5/1999 |
| JP | 2002233183 | A | 8/2002 |
| JP | 2003244990 | A | 8/2003 |
| JP | 2006230079 | A | 8/2006 |
| JP | 2006230079 | A | 8/2006 |

* cited by examiner

*Primary Examiner* — Walter Benson
*Assistant Examiner* — Antony M Paul
(74) *Attorney, Agent, or Firm* — Gifford, Krass, Sprinkle, Anderson & Citkowski, P.C.

(57) ABSTRACT

In a control of an AC motor that uses a PWM control and a rectangular-wave control, when switching is conducted from the rectangular-wave control to the PWM control, a current command generated in a current command generation unit is corrected so as to smooth the variations in a time axis direction on the basis of a target torque command value by taking the final current state in the rectangular-wave control immediately prior to switching as an initial value, thereby generating a current command after the correction. An inverter is current feedback-controlled based on the current command after the correction. As a result, the continuity from the current state immediately prior to switching of the rectangular-wave control can be ensured for the current command in the PWM control.

8 Claims, 19 Drawing Sheets

FIG. 2

| CONTROL SYSTEM | PWM CONTROL MODE | | RECTANGULAR-WAVE CONTROL MODE |
|---|---|---|---|
| | SINE-WAVE PWM | OVERMODULATION PWM | RECTANGULAR WAVE (ONE PULSE) |
| OUTPUT VOLTAGE WAVEFORM OF INVERTER | FUNDAMENTAL WAVE COMPONENT | FUNDAMENTAL WAVE COMPONENT | FUNDAMENTAL WAVE COMPONENT |
| MODULATION RATIO | 0 TO ABOUT 0.61 | MAXIMUM VALUE TO 0.78 IN SINE-WAVE PWM | 0.78 |
| SPECIFIC FEATURE | SMALL TORQUE FLUCTUATIONS | OUTPUT IN INTERMEDIATE SPEED RANGE IS INCREASED | OUTPUT IN HIGH SPEED RANGE IS INCREASED |

CONTROLLER FOR MOTOR DRIVE CONTROL SYSTEM

INCORPORATION BY REFERENCE

The disclosure of Japanese Patent Application No. 2009-003795 filed on Jan. 9, 2009 including the specification, drawings and abstract is incorporated herein by reference in its entirety.

BACKGROUND OF THE INVENTION

1. Field of the Invention

The invention relates to a controller for a motor drive control system, and more particularly to a control of an alternating current (AC) motor that uses a rectangular-wave control and a pulse width modulation (PWM) control.

2. Description of the Related Art

A drive method using an inverter is generally employed for drive controlling an AC motor by using a direct current (DC) source. The inverter is switching controlled by an inverter drive circuit, and a voltage switched, for example, according to the PWM control is applied to the AC motor.

In order to increase a voltage utilization gain and obtain a high output in a region with a high motor revolution speed, an overmodulation PWM control and a rectangular-wave control are used for an AC motor control by a modulation system in which a fundamental wave component of a motor application voltage is larger than that in the sine-wave PWM control.

Japanese Patent Application Publication No. 2006-230079 (JP-A-2006-230079) discloses an inverter control system in which the disappearance of a pulse component from a PWM signal in the zero cross vicinity where a polarity of a voltage command in the overmodulation mode changes in an inverter PWM control that drive controls an AC motor is inhibited, thereby making it possible to change smoothly the motor output between a sine-wave mode (PWM control) and a one-pulse mode (rectangular-wave control).

In JP-A-2006-230079, in the overmodulation mode, a three-phase voltage command is converted into a step-wave voltage having a high-level value (duty ratio 100%), a low level (duty ratio 0%), and a middle level (duty ratio 50%). A zero cross point can be correctly ensured by setting the zero cross point of each phase voltage in the time central position of the middle level period. Therefore, it is possible to inhibit the pulse disappearance from a PWM signal in the zero cross vicinity and reduce a positive-negative imbalance of each phase voltage.

Further, Japanese Patent Application Publication No. 11-146501 (JP-A-11-146501) discloses a controller such that when switching from a PWM pulse mode to a one-pulse mode (rectangular-wave control) is conducted in an inverter PWM control that drive controls an AC motor, the excitation current component is maintained constant at all times and a torque current component at a maximum torque output is made larger than the excitation current component by a value equal to or greater than a predetermined value till the output voltage of a power converter reaches a maximum voltage that can be outputted by the converter, and when the output voltage reaches the maximum voltage in response to the speed of the motor, the PWM pulse mode is switched to the one-pulse mode.

With the controller described in JP-A-11-146501, when switching is conducted from the PWM pulse mode to the one-pulse mode, a smooth torque control and continuous operation of power converter (inverter) can be realized, without causing a voltage discontinuity.

In the AC motor control that uses the PWM control and rectangular-wave control, when switching is conducted from the rectangular-wave control that controls a voltage phase to the PWM control based on current feedback, a control is sometimes conducted by which the control mode is actually switched in a point slightly shifted from the original snitching point in order to prevent the so-called chattering, that is, frequent switching between the two control modes.

In such a control, the current command in the PWM control changes discontinuously immediately after switching to the PWM control. As a result, the output voltage of the inverter that is applied to the AC motor can vary in a stepwise manner. Such a discontinuous variation of current command is followed by excessive current feedback control that can result in overcurrent, overvoltage, and torque surge. As a result, a stress applied to the inverter or AC motor is increased causing deterioration of the device and the torque can fluctuate instantaneously. In a case where the motor drive control system is carried on an electric vehicle, such torque fluctuations can create a sense of discomfort in the vehicle occupants.

SUMMARY OF THE INVENTION

The invention has been created to resolve the above-described problems and to provide a controller for a motor drive system that drives an AC motor, the controller increasing control stability by continuously changing a current command when switching is conducted from a rectangular-wave control to a PWM control.

The first aspect of the invention relates to a controller for a motor drive control system provided with an inverter, an AC motor that has an applied voltage controlled by the inverter, and a current detector that detects a motor current flowing between the inverter and the AC motor, the controller including: a rectangular-wave control unit, a PWM control unit, a control mode selection unit, and a current storage unit. The PWM control unit includes: a current command generation unit, a command correction unit, and a feedback control unit. The rectangular-wave control unit generates a control command of the inverter according to a rectangular-wave control that controls a voltage phase of a rectangular-wave voltage applied to the AC motor, so as to cause the AC motor to operate according to an operation command. The PWM control unit generates a control command of the inverter by a PWM control based on comparison of a carrier wave with an alternating voltage command for causing the AC motor to operate according to the operation command. The control mode selection unit is configured to select either control mode from among the rectangular-wave control and the PWM control in accordance with an operation state of the AC current motor, and the current storage unit is configured to store the final current state immediately before switching in the rectangular-wave control when the control mode is switched from the rectangular-wave control to the PWM control by the control mode selection unit. The current command generation unit is configured to generate a first current command according to the torque command in the PWM control. The command correction unit is configured to take the final current state stored in the current storage unit as an initial value during switching of the control mode from the rectangular-wave control to the PWM control and generate a second current command by correcting the first current command so as to smooth variations in a time axis direction. The feedback control unit generates the inverter control command by the PWM control conducted according to a feedback control of the motor current based on the second current command.

With the above-described controller for a motor drive control system, the current command (second current command) of the current feedback control can be set to reflect the final current state in the rectangular-wave control during switching from the rectangular-wave control to the PWM control. As a result, the continuity from the current immediately prior to switching of the rectangular-wave control can be ensured with respect to the current command in the PWM control, abrupt changes in the current command during switching from the rectangular-wave control to the PWM control can be prevented, and control stability can be improved.

It is preferred that the rectangular-wave control unit be configured to control the voltage phase by a feedback control of the motor current based on a third current command that reflects the operation command. Further, the current storage unit stores the final current state on the basis of the final third current command immediately before the control mode switching in the rectangular-wave control.

With such a configuration, when a feedback control based on the current command is conducted in the rectangular-wave control, the continuity of current command between the states before and after the switching can be ensured.

Alternatively, it is preferred that the current storage unit store as the final current state a current value based on the final motor current detected by the current detector immediately before the control mode switching in the rectangular-wave control.

With such a configuration, the continuity of the final actual current in the rectangular-wave control and the current command in the PWM control can be ensured even when the rectangular-wave control does not use a current command.

It is preferred that the operation command be a torque command value, the first current command include a first d-axis current command value and a first q-axis current command value, and the second current command include a second d-axis current command value and a second q-axis current command value. The command correction unit performs smoothing with respect to one of the first d-axis current command value and the first q-axis current command value and calculates one of the second d-axis current command value and the second q-axis current command value on the basis of the other one of the second d-axis current command value and the second q-axis current command value, which are obtained by the smoothing, and the torque command value.

With such a configuration, the smoothing processing is conducted with respect to one of the first d-axis current command value and the first q-axis current command value, and the other current command value can be calculated so as to ensure the target torque. As a result, the target torque can be guaranteed, while ensuring the continuity of current command.

It is preferred that the command correction unit stop the smoothing and match the second current command with the first current command in a case where a difference in a current command between the first current command and the second current command on a d-q coordinate axes plane becomes equal to or less than a first reference value.

With such a configuration, a feedback control based on the original current command (first current command) can be conducted in a case where the first and second current commands before and after correction on the d-q coordinate axes plane come close to each other in the PWM control. As a result, even when the second current command after the correction does not reach the original first current command due to fluctuations of motor constants or the like, where the current commands before and after the correction are close to each other, the drop in efficiency can be prevented by rapid return to the original current command.

It is preferred that the command correction unit stop the smoothing and match the second current command with the first current command in a case where a difference in a current between the motor current and the first current command on a d-q coordinate axes plane when the control mode is switched from the rectangular-wave control to the PWM control is greater than a predetermined second reference value.

With such a configuration, when the difference in current between the motor current after the switching and the first current command is large, the correction of the current command is stopped and a feedback control based on the first current command, which is the original current command, can be conducted. As a result, the motor current can be rapidly caused to follow the original current command by the usual feedback control. Therefore, the separation (disturbance) of the actual current can be rapidly canceled and motor controllability can be improved.

Further, it is preferred that the motor current include a d-axis current value and a q-axis current value, and the command correction unit stop the smoothing and match the second current command with the first current command in a case where the d-axis current value when the control mode is switched from the rectangular-wave control to the PWM control is greater than a predetermined third reference value established from a controllability range of the AC motor.

With such a configuration, when a d-axis current value gets into a positive region in a synchronous electric motor of a permanent magnet type in which a control is generally conducted with the d-axis current command value being zero or in a negative region, the d-axis current command value can be rapidly returned to zero or negative region. Therefore, the motor current can be rapidly caused to follow the original current command and motor controllability can be improved.

In accordance with the invention, in the controller for a motor drive system that drives an AC motor, the control stability can be improved by continuously changing a current command when switching is conducted from a rectangular-wave control to a PWM control.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 2 illustrates schematically control modes of an AC motor M1 in a motor drive system of the embodiment of the invention;

DETAILED DESCRIPTION OF EMBODIMENTS

Figure 1:
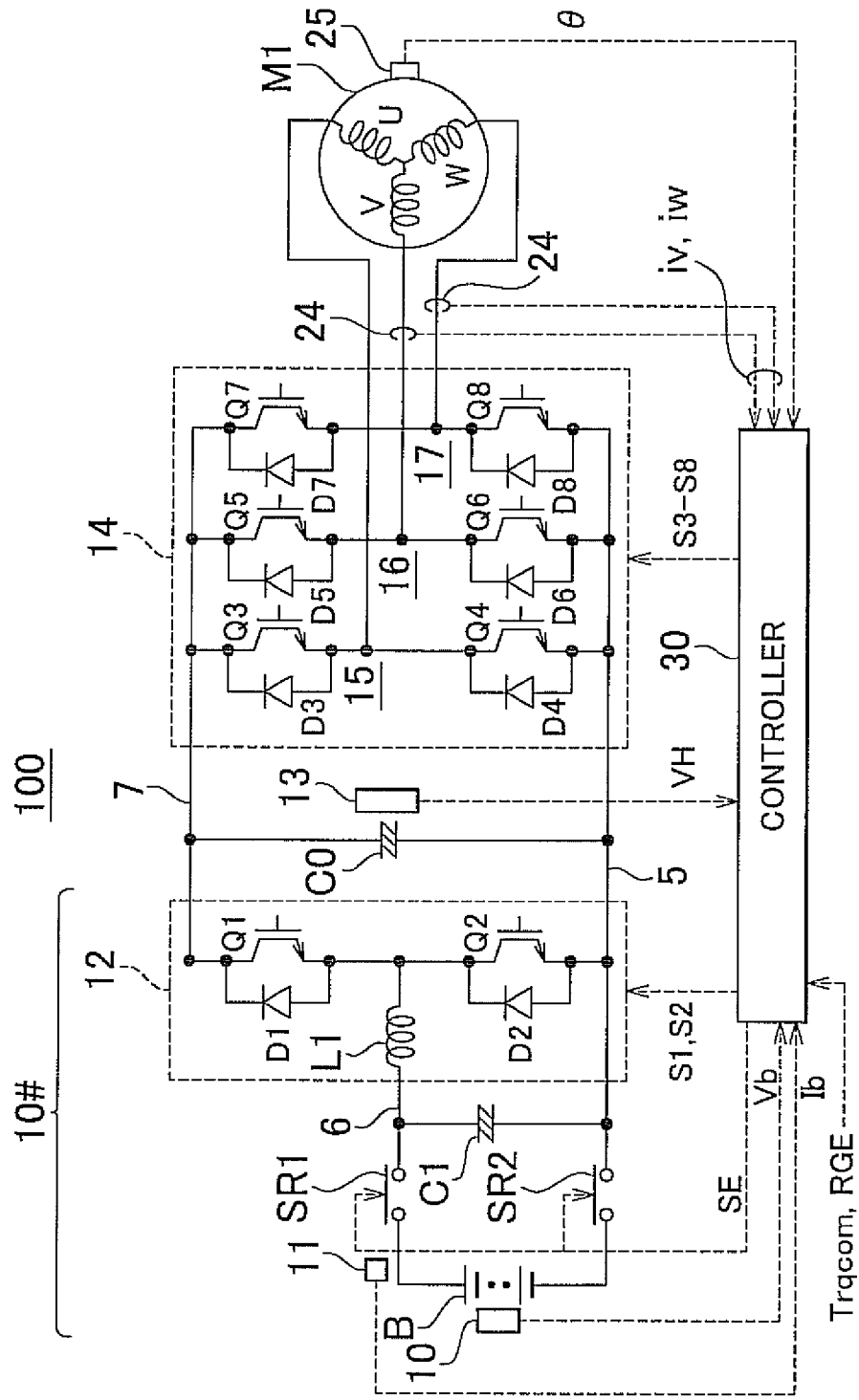
FIG. 1 is a configuration diagram of the entire motor drive control system that uses the controller for an AC motor of an embodiment of the invention.

Embodiments of the invention will be described hereinbelow in greater detail with reference to the appended drawings. Like or corresponding components in the drawings will be denoted by like reference numerals and redundant explanation thereof will be omitted.

Embodiment 1 will be explained below. First, the entire configuration of motor control will be described. FIG. 1 is a configuration diagram of the entire motor drive control system that uses the controller for the AC motor of an embodiment of the invention.

Referring to FIG. 1, a motor drive control system 100 is provided with a DC voltage generation unit 10#, a smoothing capacitor C0, an inverter 14, an AC motor M1, and a controller 30.

The AC motor M1 is, for example, a drive motor for generating a torque for driving drive wheels of an electric vehicle (an automobile in which vehicle drive power is generated by electric energy, such as a hybrid automobile, an electric automobile, and a fuel cell vehicle). Alternatively, the AC motor M1 may be configured to have a function of a generator driven by an engine or may be configured to have the functions of both a motor and a generator. Furthermore, the AC motor M1 may operate as a motor with respect to an engine, for example, may be incorporated in a hybrid automobile as a means capable of starting the engine. Thus, in the embodiment, the term "AC motor" includes a motor for AC drive, a generator, and a motor generator.

The DC voltage generation unit 10# includes a DC power source B, system relays SR1, SR2, a smoothing capacitor C1, and a converter 12.

The DC power source B is typically constituted by a secondary battery such as a nickel-hydrogen battery or a lithium-ion battery, or a capacitor such as a double layer electric capacitor. A DC voltage Vb outputted by the DC power source B and a DC current Ib that is inputted and outputted are detected by a voltage sensor 10 and a current sensor 11, respectively.

The system relay SR1 is connected between a positive pole terminal of the DC power source B and a power line 6. The system relay SR2 is connected between a negative pole terminal of the DC power source B and a ground line 5. The system relays SR1, SR2 are ON/OFF switched by a signal SE from the controller 30.

The converter 12 includes a reactor L1, power semiconductor switching elements Q1, Q2, and diodes D1, D2. The power semiconductor switching elements Q1 and Q2 are connected in series between the power line 7 and the ground line 5. The ON/OFF switching of the power semiconductor switching elements Q1 and Q2 is controlled by switching control signals S1 and S2 from the controller 30.

In the embodiment of the invention, Insulated Gate Bipolar Transistors (IGBT), power Metal Oxide Semiconductor (MOS) transistors, or power bipolar transistors can be used as the power semiconductor switching elements (referred to hereinbelow simply as "switching elements"). Reverse parallel diodes D1, D2 are disposed with respect to the switching elements Q1, Q2. The reactor L1 is connected between the connection nodes of the switching elements Q1 and Q2 and the power line 6. The smoothing capacitor C0 is connected between the power line 7 and the ground line 5.

The inverter 14 is provided in parallel between the power line 7 and the ground line 5 and composed by an U-phase upper-lower arm 15, a V-phase upper-lower arm 16, and a W-phase upper-lower arm 17. The upper-lower arm of each phase is configured by switching elements connected in series between the power line 7 and the ground line 5. For example, the U-phase upper-lower arm 15 is composed of switching elements Q3, Q4, the V-phase upper-lower arm 16 is composed of switching elements Q5, Q6, and the W-phase upper-lower arm 17 is composed of switching elements Q7, Q8. The reverse parallel diodes D3 to D8 are connected to the switching elements Q3 to Q8, respectively. The ON/OFF switching of the switching elements Q3 to Q8 is controlled by switching control signals S3 to S8 from the controller 30.

The AC motor M1 is typically a three-phase synchronous motor of a permanent magnet type and configured by commonly connecting one end of three coils of U, V, and W phases to a neutral point. The other end of each phase coil is connected to an intermediate point of the switching element of the upper-lower arm 15 to 17 of each phase.

The converter 12 is basically controlled so that the switching elements Q1 and Q2 are complementary and alternately ON/OFF switched within respective switching periods. During a boosting operation, the converter 12 raises the DC voltage Vb supplied from the DC power source B to a DC voltage VH (this DC voltage corresponding to the input voltage of the inverter 14 will be also referred to hereinbelow as "system voltage"). The boosting operation is conducted by supplying the electromagnetic energy accumulated in the reactor L1 to the power line 7 via the switching element Q1 and reverse parallel diode D1 in the ON period of the switching element Q2.

During voltage-lowering operation, the converter 12 lowers the DC voltage VH to the DC voltage Vb. The voltage-lowering operation is conducted by supplying the electromagnetic energy accumulated in the reactor L1 to the ground line 5 via the switching element Q2 and reverse parallel diode D2 in the ON period of the switching element Q1. A voltage conversion ratio in these boosting operation and voltage-lowering operation (ratio of VH and Vb) is controlled by the ON period ratio (duty ratio) of the switching elements Q1, Q2 in the above-described switching periods. Further, where the switching elements Q1 and Q2 are fixed to ON and OFF, respectively, it is possible to set VH=Vb (voltage conversion ratio=1.0).

The smoothing capacitor C0 smoothes the DC voltage from the converter 12 and supplies the smoothed DC voltage to the inverter 14. The voltage sensor 13 detects a voltage at both ends of the smoothing capacitor C0, that is, the system voltage VH, and outputs the detected value to the controller 30.

In a case where a torque command value of the AC motor M1 is positive (Trqcom>0), where a DC voltage is supplied from the smoothing capacitor C0, the inverter 14 converts a DC voltage into an AC voltage by a switching operation of the switching elements Q3 to Q8 corresponding to the switching control signals S3 to S8 from the controller 30 and drives the AC motor M1 so as to output a positive torque. Where the torque command value of the AC motor M1 is zero (Trqcom=0), the inverter 14 converts the DC voltage into an AC voltage by a switching operation corresponding to the switching control signals S3 to S8 and drives the AC motor M1 so that the torque becomes zero. As a result, the AC motor M1 is driven so as to generate a zero or positive torque indicated by the torque command value Trqcom.

Further, during the regenerative braking of the electric vehicle that carries the motor drive control system 100, the torque command value Trqcom of the AC motor M1 is set to a negative value (Trqcom<0). In this case, the inverter 14 converts the AC voltage generated by the AC motor M1 into a DC voltage by a switching operation corresponding to the switching control signals S3 to S8 and supplies the converted DC voltage (system voltage) to the converter 12 via the smoothing capacitor C0. The regenerative braking as referred to herein includes braking that is accompanied by regenerative power generation when the driver operating the electric vehicle depresses a foot brake pedal and also deceleration of the vehicle (or termination of acceleration) that is accompanied by regenerative power generation when the driver takes the foot off the accelerator pedal as the vehicle travels.

The current sensor 24 detects a motor current MCRT flowing in the AC motor M1 and outputs the detected motor current to the controller 30. Further, because the sum of instantaneous values of three-phase currents iu, iv, and iw is zero, it is suffice to dispose the current sensor 24 as shown in FIG. 1 so as to detect the motor current of two phases (for example, the V-phase current iv and W-phase current iw).

A revolution angle sensor (resolver) 25 detects a revolution angle θ of the AC motor M1 and sends the detected revolution angle θ to the controller 30. The controller 30 can calculate the rpm (revolution speed) and angular speed ω (rad/s) of the AC motor M1 on the basis of the revolution angle θ. Where the revolution angle θ is directly computed in the controller 30 from a motor voltage or current, the revolution angle sensor 25 may be omitted.

The controller 30 is constituted by an electronic control unit (controller) and controls the operation of the motor drive control system 100 by software processing based on executing a program that has been stored in advance by the Central Processing Unit (CPU) (not shown in the figure) and/or by hardware processing using a special electronic circuitry.

As a representative function, the controller 30 controls the operation of the converter 12 and inverter 14 so that the AC motor M1 outputs a torque corresponding to the torque command value Trqcom according to the below-described control system on the basis of the inputted torque command value Trqcom, DC voltage Vb detected by the voltage sensor 10, DC current Ib detected by the current sensor 11, system voltage VH detected by the voltage sensor 13, motor currents iv, iw from the current sensor 24, and revolution angle θ from the revolution angle sensor 25. Thus, the switching control signals S1 to S8 for controlling the converter 12 and inverter 14 in the above-described manner are generated and outputted to the converter 12 and inverter 14.

During the boosting operation of the converter 12, the controller 30 feedback controls the system voltage VH and generates the switching control signals 51, S2 such that the system voltage VH matches the voltage command value.

Where the controller 30 receives from an external control device a regeneration signal RGE that indicates that the electric vehicle has entered a regenerative braking mode, the controller generates the switching control signals S3 to S8 so as to convert the AC voltage generated in the AC motor M1 into a DC voltage and outputs the generated switching control signals to the inverter 14. As a result, the inverter 14 converts the AC voltage generated in the AC motor M1 into a DC voltage and supplies the generated voltage to the converter 12.

Further, when the controller 30 receives from an external control device a regeneration signal RGE that indicates that the electric vehicle has entered a regenerative braking mode, the controller generates the switching control signals 51, S2 so as to lower the DC voltage supplied from the inverter 14 and outputs the generated switching control signals to the converter 12. As a result, the AC voltage generated by the AC motor M1 is converted into the DC voltage, lowered, and supplied to the DC power source B.

The control modes of the embodiment will be explained below. The control of the AC motor M1 performed by the controller 30 will be described in greater details.

FIG. 2 illustrates schematically control modes of the AC motor M1 in the motor drive control system of an embodiment of the invention.

As shown in FIG. 2, in the motor drive control system 100 of the embodiment of the invention, the control of the AC motor M1, that is, power conversion in the inverter 14 can be switched between three control modes.

A sine-wave PWM control is used as a typical PWM control, and ON/OFF switching of the upper-lower arm elements of each phase is controlled according to a voltage comparison result of a sine-wave voltage command and a carrier wave (typically a triangular wave). As a result, the duty is controlled so that the fundamental wave component becomes a sine wave within a predetermined period with respect to a combination of a high-level period corresponding to an ON period of an upper arm element and a low-level period corresponding to an ON period of a lower arm element. It is widely recognized that in the sine-wave PWM control in which the amplitude of a sine-wave voltage command is restricted to a range of equal to or less than the carrier wave amplitude, the fundamental wave component of the voltage applied to the AC motor M1 (will be also simply referred to hereinbelow as "voltage applied to motor") can be increased only to about 0.61 times a DC link voltage of the inverter. In the description, a ratio of the fundamental wave component (effective value) of the voltage applied to the motor (voltage between the lines) to the DC link voltage (that is, the system voltage VH) of the inverter 14 will be referred to as "modulation ratio".

In the sine-wave PWM control, the amplitude of the sine-wave voltage command is within a range of equal to or less than the carrier wave amplitude. Therefore, the interline voltage that is applied to the AC motor M1 is a sine wave.

By contrast, in the rectangular-wave control, one rectangular wave pulse in which a ratio of the high-level period and low-level period is 1:1 is applied to the AC motor within a predetermined period. As a result, the modulation ratio is increased to 0.78.

In the overmodulation PWM control, the amplitude of the voltage command (sine-wave component) is within a range above the carrier wave amplitude and the PWM control similar to the above-described sine-wave PWM control is performed. In particular, the fundamental wave component can be increased by causing the voltage command to deviate from the original sine-wave shape (amplitude correction), and the modulation ratio can be increased from the maximum modulation ratio in the sine-wave PWM control to a range of 0.78. In the overmodulation PWM control, the amplitude of the voltage command (sine-wave component) is larger than the carrier wave amplitude. Therefore, the interline voltage applied to the AC motor M1 is a distorted voltage rather than a sine-wave voltage.

Where a revolution speed or output torque in the AC motor M1 increases, the induced voltage rises. Therefore, the necessary drive voltage (voltage necessary for the motor) rises. The boosted voltage produced by the converter 12, that is, the system voltage VH, has to be set higher than the voltage necessary for the motor. Meanwhile, there is a limit value (VH maximum voltage) for the boosted voltage produced by the converter 12, that is, the system voltage VH.

Therefore, either of the PWM control mode based on the sine-wave PWM control or overmodulation PWM control and the rectangular-wave control mode that controls an amplitude or phase of a voltage (AC) applied to the motor by feedback of the motor current can be selectively used correspondingly to the operation state of the AC motor M1. In the rectangular-wave control, the amplitude of the voltage applied to the motor is fixed. Therefore, only the phase of the voltage applied to the motor is a controllable parameter. In the rectangular-wave control, a torque feedback control can be executed by which the phase of the rectangular-wave voltage is directly controlled on the basis of a difference between a target torque command value and an actual torque value, or the phase of the voltage applied to the motor can be controlled by a feedback of the motor current in the same manner as in the PWM control. In Embodiment 1, the rectangular-wave control is explained in which the phase is controlled by feedback of the motor current.

Figure 3:
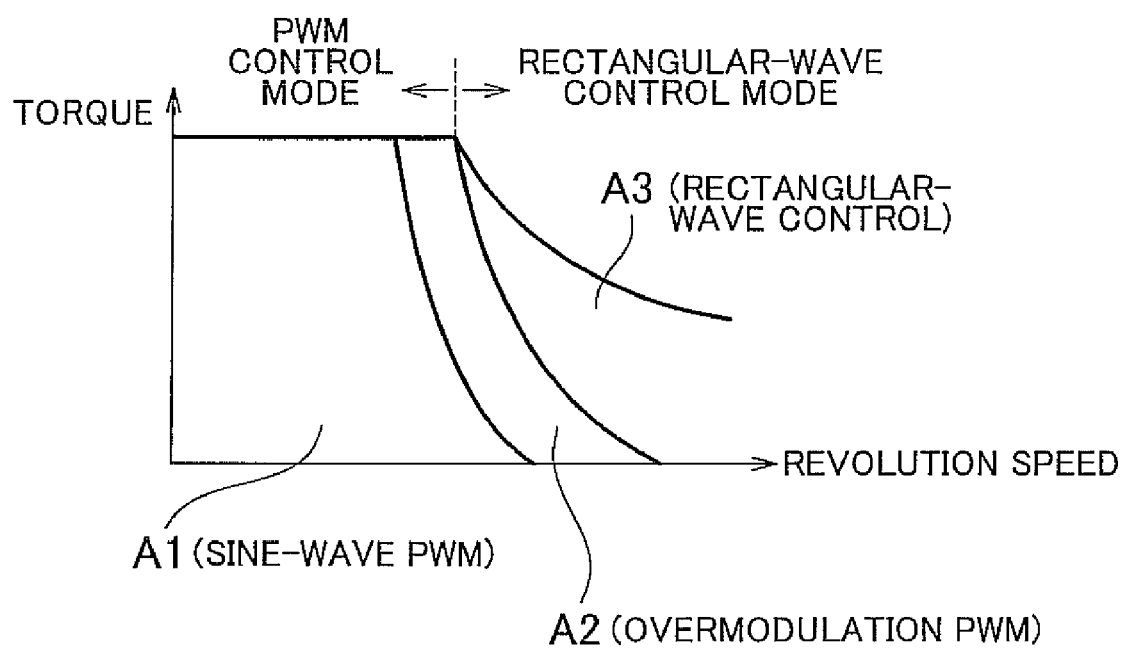
FIG. 3 illustrates a correspondence relationship between an operation state of the AC motor and each control mode in the embodiment.

FIG. 3 illustrates a correspondence relationship between an operation state of the AC motor M1 and the above-described control modes. Referring to FIG. 3, in general, the sine-wave PWM control is used in the low-rpm region A1 to decrease torque fluctuations, the overmodulation PWM control is used in the intermediate-rpm region A2, and the rectangular-wave control is used in the high-rpm region A3. In particular, an increase in the output of the AC motor M1 is realized by using the overmodulation PWM control and rectangular-wave control. Thus, which of the control modes shown in FIG. 2 is to be used can be essentially determined within a range of realizable modulation ratio.

Figure 4:
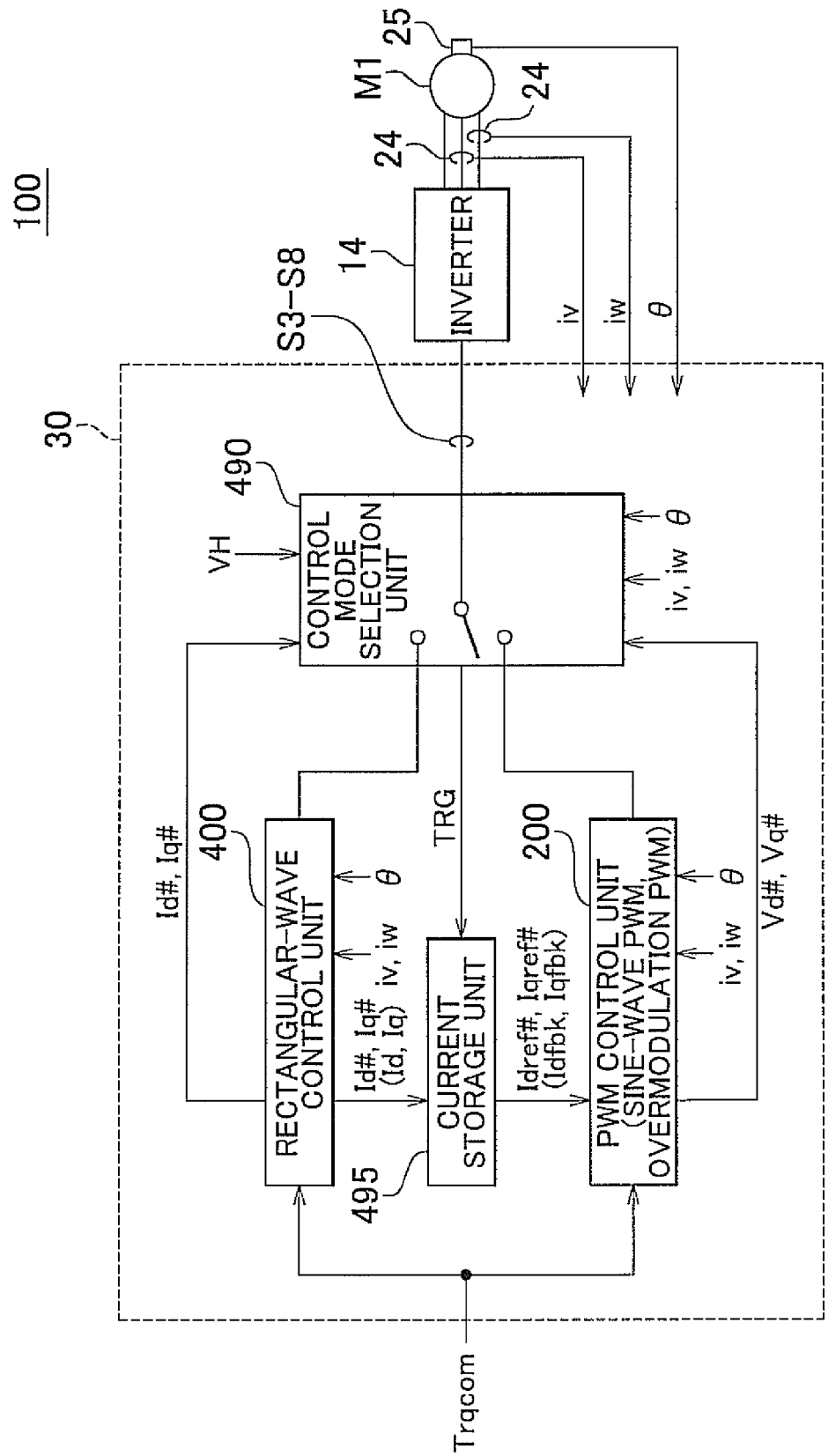
FIG. 4 is a functional block diagram illustrating a control configuration of the controller for an AC motor of the embodiment.

The configuration of the controller will be explained below. FIG. 4 is a functional block diagram illustrating the control configuration of the controller 30 of the AC motor of the embodiment. Each functional block in the block diagram explained below with reference to FIG. 4 is realized by software or hardware processing with the controller 30.

Referring to FIG. 4, the controller 30 includes a PWM control unit 200, a rectangular-wave control unit 400, a control mode selection unit 490, and a current storage unit 495. In the PWM control unit 200, the sine-wave PWM control and overmodulation PWM control are selectively executed.

First, a case will be explained in which the sine-wave PWM control is selected in the PWM control unit 200. The torque command value Trqcom, motor currents iv and iw detected by the current sensor 24, and revolution angle $\theta$ detected by the revolution angle sensor 25 are inputted to the PWM control unit 200. Based on this information, the PWM control unit 200 generates voltage command values Vd#, Vq# that will be applied to the inverter 14. The generated voltage command values Vd#, Vq# are outputted to the control mode selection unit 490. Furthermore, on the basis of the voltage command values Vd#, Vq#, the PWM control unit 200 generates the switching control command values S3 to S8 that will drive the inverter 14 and outputs the switching control command values to the inverter 14.

In a case where the overmodulation PWM control is selected in the PWM control unit 200, a function of conducting the voltage amplitude correction in the above-described manner is added to the aforementioned sine-wave PWM control. As a result, the fundamental wave component of the voltage command value is increased and an output larger than that of the sine-wave PWM control is generated.

The rectangular-wave control unit 400 receives an input of the torque command value Trqcom, motor currents iv and iw detected by the current sensor 24, and revolution angle $\theta$ detected by the revolution angle sensor 25. Then, similarly to the PWM control unit 200, the rectangular-wave control unit 400 generates voltage command values Vd#, Vq# that will be applied to the inverter 14 by conducting a current feedback control from the d-axis and q-axis current command values calculated from the torque command value Trqcom and current detection values obtained by converting the motor current detected by the current sensor 24 to the d axis and q axis. In the rectangular-wave control, the amplitude $(V=(Vd\#^2+Vq\#^2)^{1/2})$ of the command voltage is fixed to a value corresponding to the system voltage VH. Therefore, the current and voltage command values are generated so that only the phase ($\phi v$) of the voltage command is controlled.

As for the generation of the current command values Id#, Iq#, for example, only a q-axis current value is set by feedback control, but the d-axis current can be calculated by reverse calculations such that the voltage command assumes a predetermined value. The generated current command values Id#, Iq# are outputted by the rectangular-wave control unit 400 to the control mode selection unit 490 and current storage unit 495.

The system voltage VH, voltage command values Vd#, Vq# from the PWM control unit 200, current command values Id#, Iq# from the rectangular-wave control unit 400, motor currents iv and iw detected by the current sensor 24, and revolution angle $\theta$ detected by the revolution angle sensor 25 are inputted to the control mode selection unit 490. The control mode selection unit 490 determines, as will be described below, whether the PWM control mode is required to be switched to the rectangular-wave control mode on the basis of the modulation ratio calculated from the system voltage VH and voltage command values Vd#, Vq#. The control mode selection unit 490 also determines whether the rectangular-wave control mode is required to be switched to the PWM control mode on the basis of the current phase φi# found from the current command values Id#, Iq#.

The control mode selection unit 490 then outputs a switching signal TRG to the current storage unit 495 when the control mode is switched from the rectangular-wave control mode to the PWM control mode.

When the switching unit TRG from the control mode selection unit 490 is inputted to the current storage unit 495, the current storage unit stores the final values of the current command values Id#, Iq# inputted from the rectangular-wave control unit 400 as final current states (Idref#, Iqref#) in the rectangular-wave control.

The current storage unit 495 then outputs the final current command values Idref#, Iqref# that have been stored to the PWM control unit 200.

A method of switching from the rectangular-wave control to the PWM control will be described below. The control mode selection among the PWM control and rectangular-wave control in the control mode selection unit 490 in the control block diagram shown in FIG. 4 will be explained below in greater detail with reference to FIG. 5. The steps in the flowchart shown in FIG. 5 and subsequent figures are realized by executing within the predetermined period the program that has been stored in advance in the controller 30. Alternatively, it is also possible to create a special hardware (electronic circuit) for some of the steps and realize the processing by using the hardware.

Figure 5:
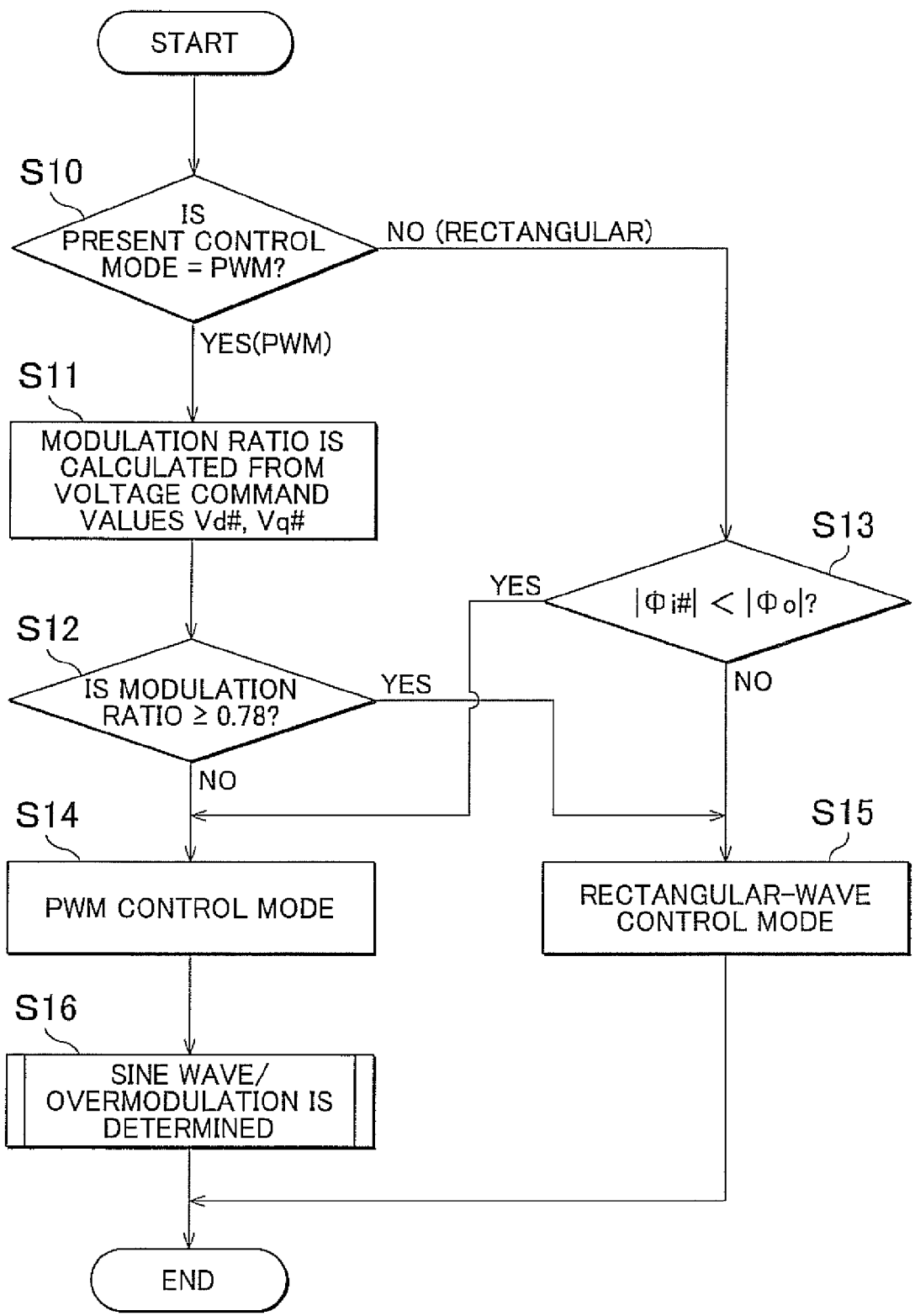
FIG. 5 is a flowchart illustrating the processing sequence of switching processing of control modes between the PWM control and the rectangular-wave control in the embodiment.

Referring to FIG. 5, the controller 30 determines in step (the word "step" will be abbreviated hereinbelow as S) 10 as to whether the present control mode is the PWM control mode. Where the present control mode is the PWM control mode (YES in S10), the controller 30 calculates in S11 a modulation ratio at the time the input voltage VH of the inverter 14 is converted into the voltage that is applied to the AC motor M1 on the basis of the voltage command values Vd#, Vq# and system voltage VH according to the PWM control mode.

For example, the modulation ratio FM is calculated by the following Equation (1)

$$FM = (Vd\#^2 + Vq\#^2)^{1/2}/VH \qquad (1)$$

Then, in S12, the controller 30 determines whether the modulation ratio found in S11 is equal to or higher than 0.78. When the modulation ratio is equal to or higher than 0.78 (YES in S12), the adequate AC voltage cannot be generated in the PWM control mode. Therefore, the controller 30 advances the processing to S15 and switches the control mode so as to select the rectangular-wave control mode.

Where the determination result in S12 is NO, that is, when the modulation ratio found in S11 is less than 0.78, the controller 30 continues selecting the PWM control mode in S14.

When the controller 30 determines that present control mode is the rectangular-wave control mode (NO in S10), the rectangular-wave control unit 400 determines in S13 whether the absolute value of a current phases φi# of the current command values Id#, Iq# of the rectangular-wave control unit 400 is less than the absolute value of a predetermined basic phase value φ0.

Where the absolute value of the current phases φi# is less than the absolute value of the predetermined basic phase value φ0 (YES in S13), the controller 30 determines whether it is necessary to switch the control mode from the rectangular-wave control mode to the PWM control mode. In this case, the controller 30 selects the PWM control mode in S14.

Where the determination result in S11 is NO, that is, where the absolute value of the current phases φi# is equal to or greater than the absolute value of the predetermined basic phase value φ0, the controller 30 continues selecting the rectangular-wave control mode in S15.

When the PWM control mode is selected (S14), the controller 30 further determines in S16 which of the sine-wave PWM control and overmodulation PWM control will be applied. This determination can be executed by comparing the modulation ratio FM with a predetermined threshold (for example, 0.61 which is a theoretical maximum value of the modulation ratio of the sine-wave PWM control).

When the modulation ratio is equal to or less than the threshold, the sine-wave PWM control is used. By contrast, when the modulation ratio is greater than the threshold, the overmodulation PWM control is used.

Thus, the control mode selection can be executed based on the motor current MCRT (iv, iw) detected by the current sensor 24, input voltage (system voltage) VH of the inverter 14 that is detected by the voltage sensor 13, voltage command values Vd#, Vq# generated by the PWM control unit 200, and current command values Id#, Iq# generated by the rectangular-wave control unit 400.

In the explanation above, the determination relating to switching from the rectangular-wave control to the PWM control is made based on the current phase of the current command value, but this determination can be also made based on the modulation ratio similarly to the determination relating to switching from the PWM control to the rectangular-wave control.

Problems arising during switching from the rectangular-wave control to the PWM control will be described below. Thus, problems associated with the motor control configuration that arise during switching from the rectangular-wave control to the PWM control will be described. In particular a problem associated with control stability that arises when the control mode advances in the sequence (rectangular-wave control-overmodulation PWM control-sine-wave PWM control) because of the output decrease of the AC motor M1 from the high-output region will be described below.

Figure 6:
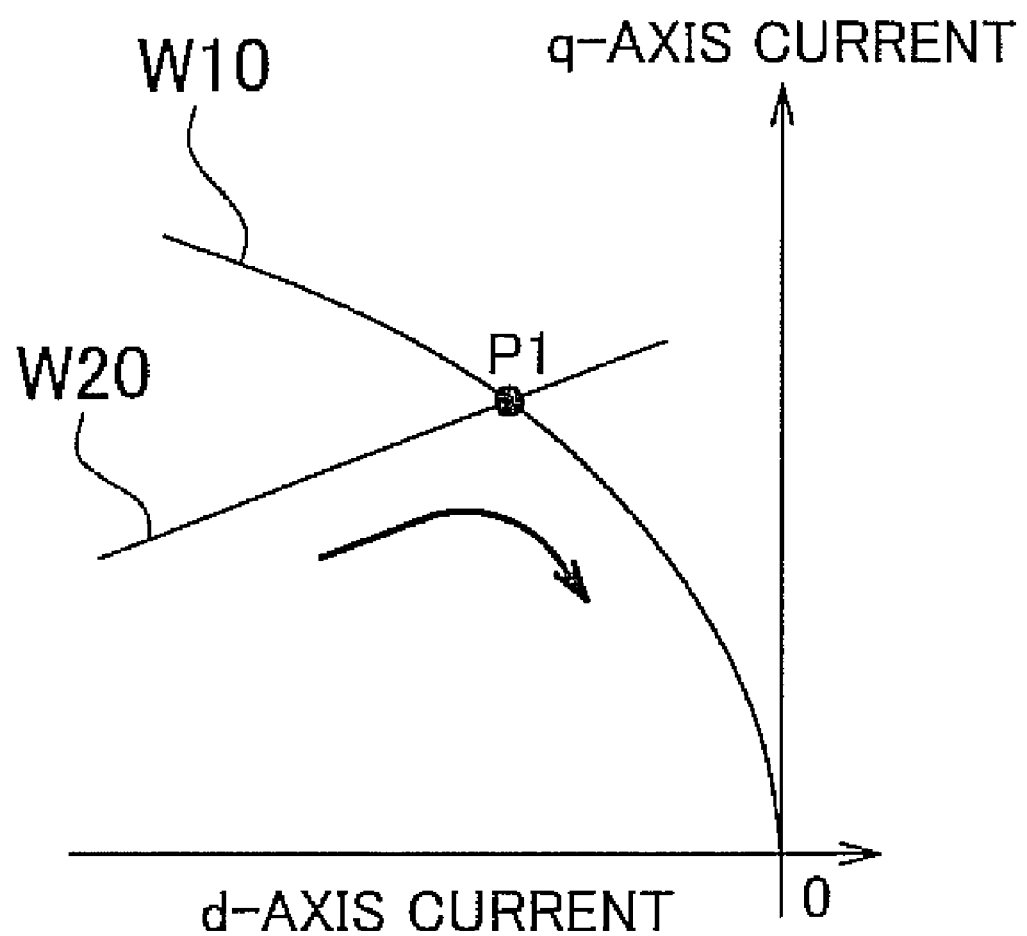
FIG. 6 is a schematic diagram illustrating the variations of d-axis and q-axis current command values on the d-q axes plane in the rectangular-wave control and the PWM control.

FIG. 6 shows an example of variations of d-axis and q-axis current command values on the d-q axes plane in the rectangular-wave control and the PWM control. Referring to FIG. 6, the current command values along the d axis and q axis are plotted against the abscissa and ordinate. In the figure, W10 shows a current command line in the PWM control. The current command line in the PWM control represents the trajectory of a current vector that indicates a current phase at which the torque assumes a maximum value against the same current on the d-q axes plane. Therefore, by driving the motor by the current command along the current command line, it is possible to generate the torque most efficiently with respect to the motor current. Further, W20 is a line indicating the trajectory of current command established so that the voltage phase for outputting the target torque can be reached in the rectangular-wave control.

When switching is conducted from the rectangular-wave control to the PWM, the current command changes in the direction shown by an arrow in there along the current command line W20 as the output decreases in the rectangular-wave control. When an intersection point P1 of lines W10 and W20 is reached, the control mode is switched from the rectangular-wave control to the PWM control, and then the current command changes along the W10 line.

In a case where the output increases, the current command changes in the direction opposite that of the arrow in the figure. Thus, the current command changes along the W10 line due to the PWM control, and when the intersection point P1 is reached, the control mode is switched from the PWM control to the rectangular-wave control. Then, the rectangular-wave control is executed along the W20 line.

In a case of such switching, the so-called chattering, that is, frequent repetition of switching of the control mode from the rectangular-wave control to the PWM control and vice versa can occur in the vicinity of the intersection point P1. For this reason in the actual control, as shown in FIG. 7, a method is used by which the control mode is switched from the rectangular-wave control to the PWM control when a point P20 somewhat displaced from the intersection point P1 along the W20 line is established.

Figure 7:
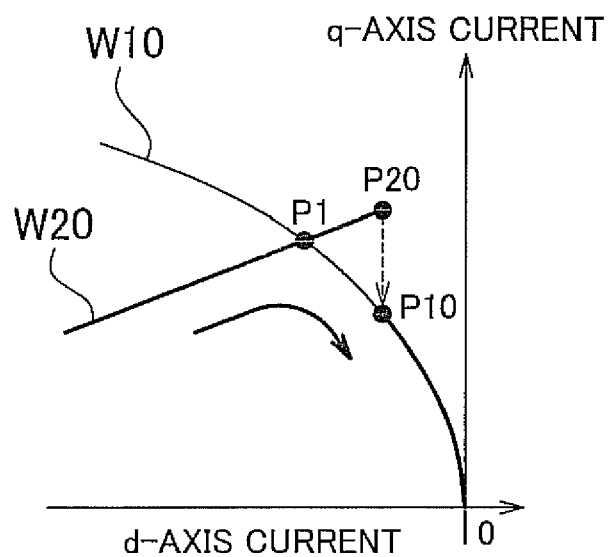
FIG. 7 is a schematic diagram illustrating the variations of d-axis and q-axis current command values on the d-q axes plane when switching is conducted from the rectangular-wave control to the PWM control.

However, with such a switching method, because the current command changes discontinuously from P20 to P10 in FIG. 7, the difference in current value between the states before and after the control mode is switched is large. Thus, the current feedback in the PWM control can cause an excessive output in response to this current difference and control stability can be lost.

In Embodiment 1, the current command correction control is conducted that resolves this problem by causing continuous variation of the current command from the state before the control mode is switched to the state thereafter.

Figure 8:
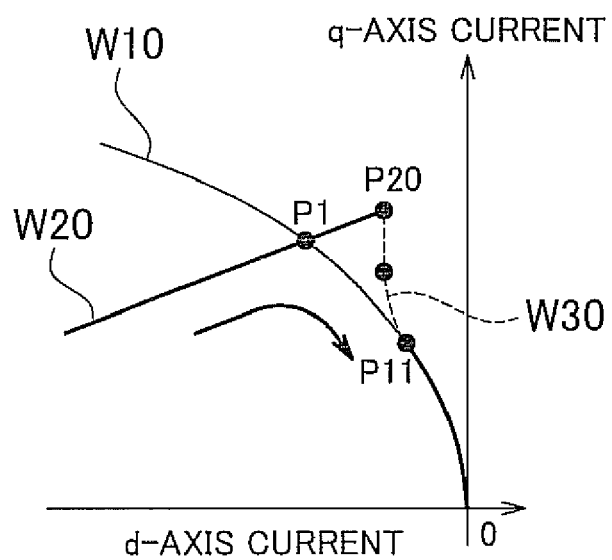
FIG. 8 is a schematic diagram of a current command correction control in Embodiment 1.

The PWM control mode of Embodiment 1 will be explained below. FIG. 8 is a schematic diagram of current command correction control in Embodiment 1. Similarly to FIG. 7, FIG. 8 shows an example of variations in the d-axis and q-axis current command values on the d-q axes plane. In the current command correction control of Embodiment 1, when the current command is changed from a final current command P20 on the current command line (W20) of the rectangular-wave control to the current command P11 after switching in the PWM control, the final current command P20 is taken as an initial value, and the current command in the PWM control after the switching is corrected so as to smooth the variations of the current command in the direction of time axis toward P11. Thus, as shown in FIG. 8, when switching is conducted from the rectangular-wave control to the PWM control, the current command can be caused to change continuously by generating a current command along the broken line W30 from P20 toward P11.

Figure 9:
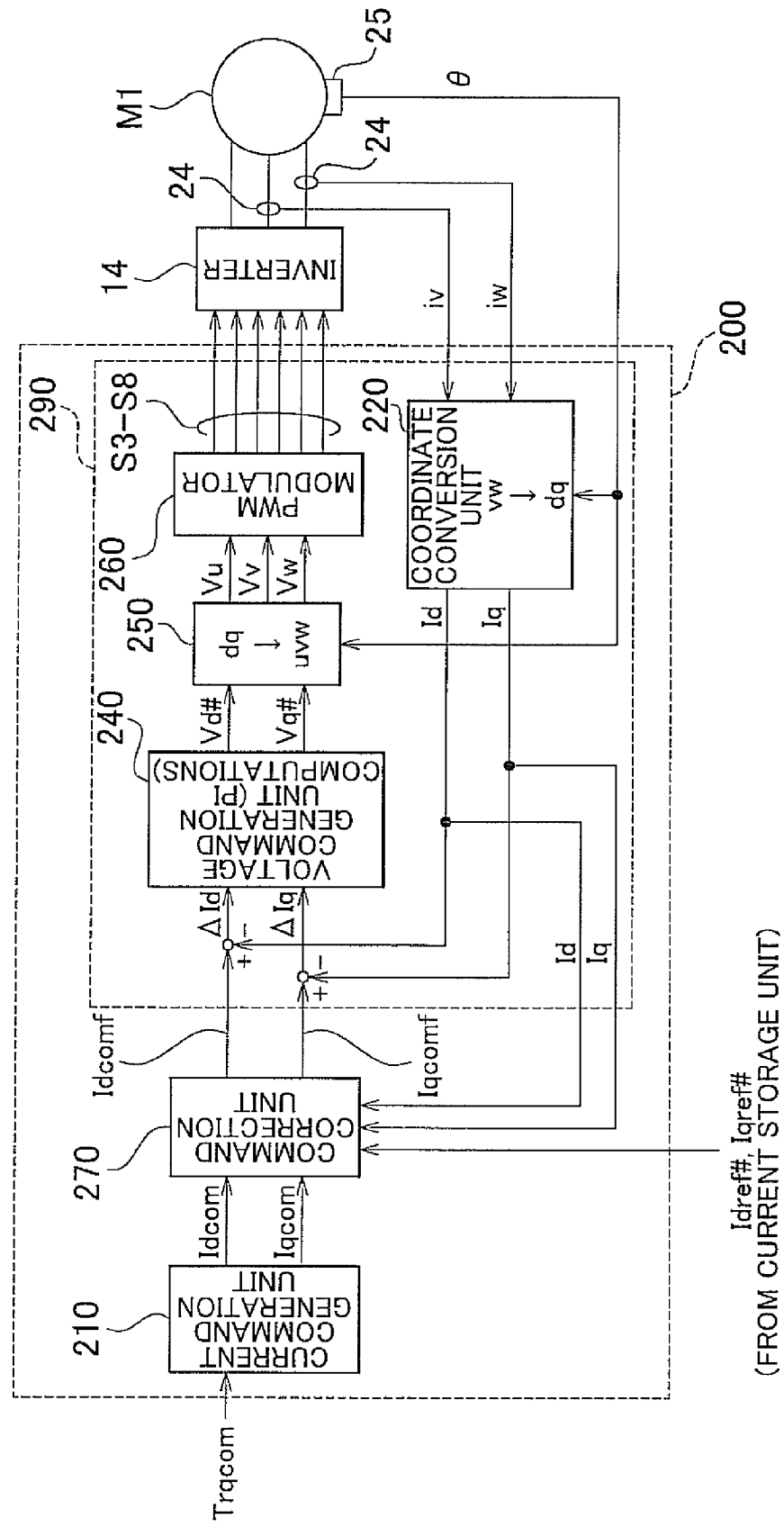
FIG. 9 is an example of a functional block diagram of a PWM control unit for explaining in details the current command correction control in Embodiment 1.

The aforementioned current command correction control will be described below in greater detail with reference to FIG. 9. FIG. 9 is a functional block diagram illustrating the control configuration of the PWM control unit 200 in Embodiment 1.

Referring to FIG. 9, the PWM control unit 200 includes a current command generation unit 210, a command correction unit 270, and a feedback control unit 290. Further, the feedback control unit 290 includes coordinate conversion units 220, 250, a voltage command generation unit 240, and a PWM modulation unit 260.

The current command generation unit 210 generates a d-axis current command value Idcom and a q-axis current command value Iqcom correspondingly to the torque command value Trqcom of the AC motor M1 by using a table that has been created in advance according to the current command line (W10) shown in FIG. 6.

The command correction unit 270 receives an input of the current command values Idcom and Iqcom from the current command generation unit 210 and also receives an input of final current command values Idref#, Iqref# in the rectangular-wave control mode from the rectangular-wave control unit 400 and mode currents Id, Iq from the coordinate conversion unit 220. Then, the command correction unit 270 takes the final current command values Idref#, Iqref# as initial values and generates current command values Idcomf and Iqcomf after the correction by conducting correction by smoothing processing that smoothes the variations of each current command value of the d axis and q axis in the direction of time axis. The smoothing can be conducted by a conventional method, for example, by using a primary low-pass filter or a rate limiter.

On the basis of the current command values Idcomf and Iqcomf after the correction, the feedback control unit 290 generates switching control signals S3 to S8 to the inverter 14 by conducting PWM control according to the feedback control of the motor current.

The coordinate conversion unit 220 calculates the d-axis current value Id and q-axis current value Iq in the d-q axes plane from the current of each phase calculated from the V-phase current iv and W-phase current iw detected by the current sensor 24 by a coordinate conversion (3 phases→2 phases) using the revolution angle θ of the AC motor M1 detected by the revolution angle sensor 25.

A difference ΔId (ΔId=Idcomf−Id) with the d-axis current command value after the correction and a difference ΔIq (ΔIq=Iqcomf−Iq) with the q-axis current command value after the correction is inputted to the voltage command generation unit 240. The voltage command generation unit 240 finds a control difference by conducting proportional integration (PI) based on a predetermined gain with respect to the d-axis current difference ΔId and q-axis current difference ΔIq and generates a d-axis voltage command value Vd# and a q-axis voltage command value Vq# corresponding to the control difference.

The coordinate conversion unit 250 converts the d-axis voltage command value Vd# and q-axis voltage command value Vq# into phase voltage commands Vu, Vv, Vw of U phase, V phase, and W phase by coordinate conversion (2 phases→3 phases) by using the revolution angle θ of the AC motor M1.

The PWM modulation unit 260 generates switching control signals S3 to S8 that ON/OFF control the upper-lower arm elements of each phase of the inverter 14 on the basis of comparison of the carrier wave generated by an oscillator (not shown in the figure) and the AC voltage commands (shown inclusive of Vu, Vv, Vw). A quasi-sine wave voltage for each phase of the AC motor M1 is generated by the switching control signals S3 to S8.

Thus, the inverter 14 is switching controlled according to the switching control signals S3 to S8 generated by the PWM control unit 200, thereby applying an AC voltage for outputting a torque that follows the torque command value Trqcom to the AC motor M1.

As described above, by conducting feedback control based on the current command values Idcomf, Iqcomf after the correction in the PWM control unit 200, it is possible to vary the current command continuously when switching is performed from the rectangular-wave control to the PWM control.

Figure 10:
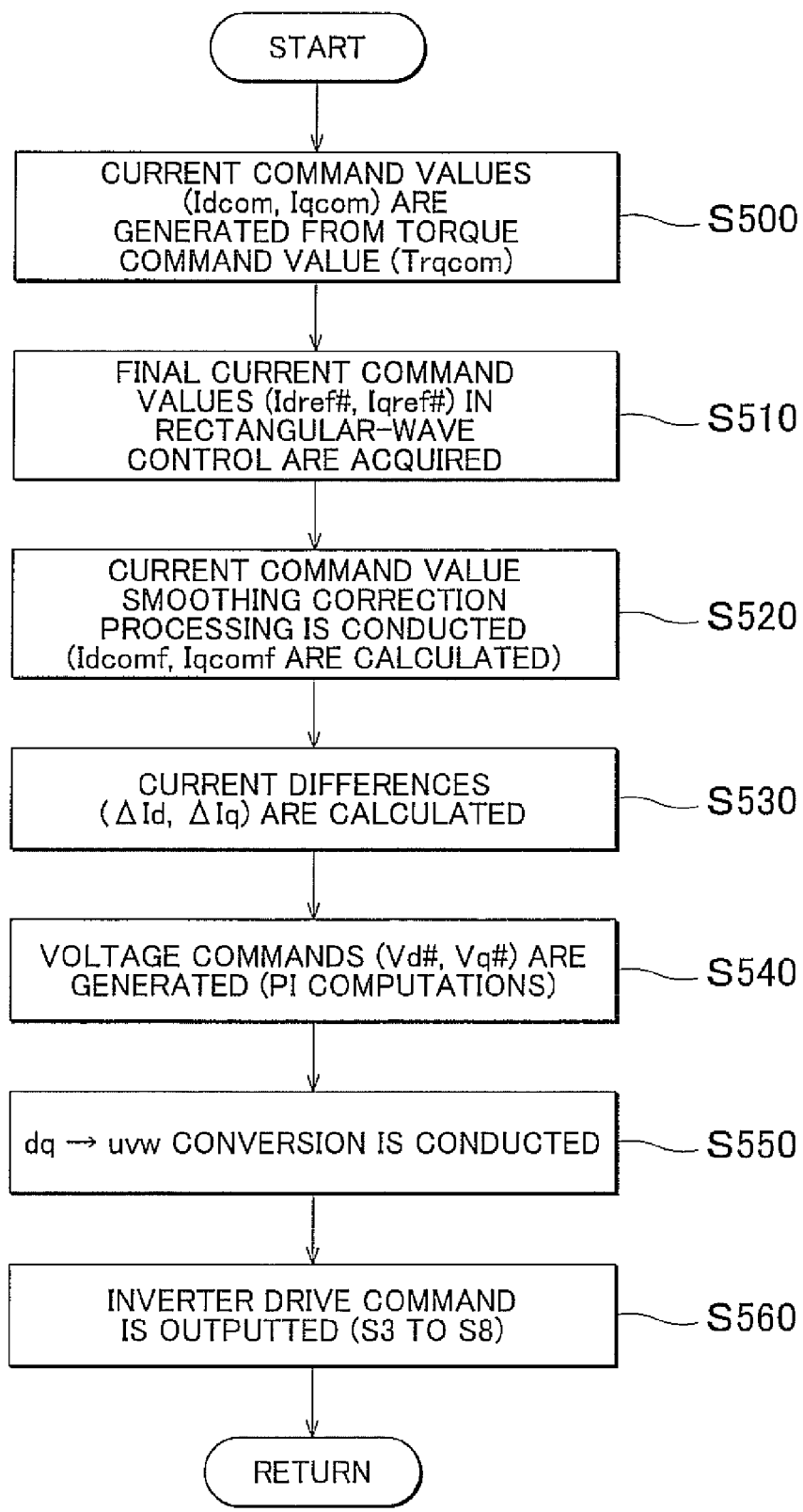
FIG. 10 is a flowchart illustrating a control processing sequence of the current command correction control in Embodiment 1.

FIG. 10 shows a flowchart illustrating the control processing procedure of the current command correction control shown in FIG. 9.

Referring to FIG. 10, the controller 30 generates in S500 the d-axis current command value Idcom and q-axis current command value Iqcom by processing in the current command generation unit 210. The controller 30 then in S510 acquires the final current command values Idref#, Iqref# in the rectangular-wave control that are inputted by the current storage unit 495.

The controller 30 then in S520 calculates the d-axis current command value Idcomf after the correction by conducting the smoothing processing in the command correction unit 270 on the basis of the d-axis current command value Idcom generated in S500 and the d-axis final current command value Idref# in the rectangular-wave control that has been acquired in S510. The q-axis current command value Iqcomf after the correction is similarly calculated with respect to the q axis (S520).

Then, the controller 30 in S530 calculates the current differences ΔId and ΔIq between the calculated current command values Idcomf, Iqcomf after the correction and Id, Iq obtained by d-q axes conversion of motor current values MCRT.

The controller 30 then generates the voltage command values Vd#, Vq# by conducting PI computations of the current differences ΔId, ΔIq in the voltage command generation unit 240 (S540). The voltage command values Vd#, Vq# are coordinate converted (2 phases→3 phases) by the coordinate conversion unit 250, and voltage commands (Vu, Vv, Vw) of each phase are generated (S550). The controller 30 then generates the inverter drive commands S3 to S8 with the PWM modulation unit 260 on the basis of the current commands of each phase and outputs the inverter drive commands to the inverter 14.

Where the controller 30 thus executes the control processing according to the flowchart shown in FIG. 10, it is possible to realize the current command correction control in Embodiment 1 that is similar to that illustrated by FIG. 9.

A variation example of Embodiment 1 will be explained below. In Embodiment 1 a case is explained in which the rectangular-wave control unit 400 provides a current command similarly to the PWM control unit 200 thereby controlling the phase of the voltage applied to the motor.

As described hereinabove, in the rectangular-wave control, it is also possible to apply a method by which the phase ϕv of the voltage applied to the motor is directly controlled by the torque feedback control, without generating a current command. In such a case, because the current command in the rectangular-wave control is not generated, the correction processing similar to that of Embodiment 1 cannot be conducted.

Further, in the case of the aforementioned torque feedback control, the current feedback such as in the rectangular-wave control of Embodiment 1 is not conducted. Therefore, the motor current cannot be directly controlled. As a result, the motor current can be disturbed by the torque command. Accordingly, the following variation example of the embodiment can be considered.

Thus, in the variation example of Embodiment 1, when the phase ϕv of the voltage applied to the motor is directly controlled by the torque feedback and no current command is generated, the actual motor current immediately prior to the control mode switching is taken as an initial value, and the current command in the PWM control is corrected in the same manner as in Embodiment 1. This procedure will be described below. Thus, by taking the actual motor current in the rectangular-wave control immediately prior to switching as the initial value, even when the motor current is disturbed, it is possible to generate a current command such that ensures the continuity of the motor current from the disturbed state.

Figure 11:
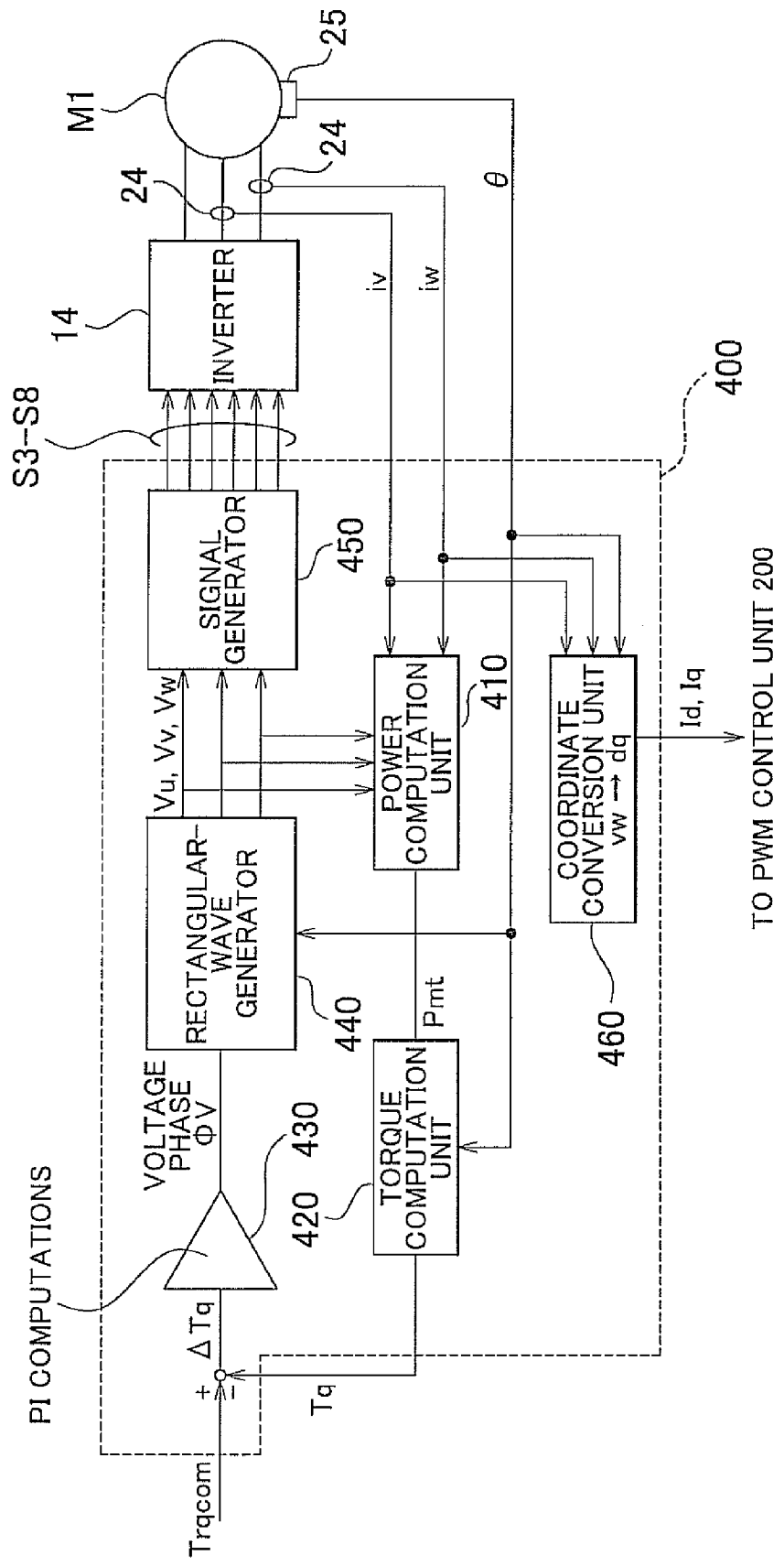
FIG. 11 is a functional block diagram for explaining the motor control configuration based on the rectangular-wave control in a variation example of Embodiment 1.

FIG. 11 shows a functional block diagram that illustrates the motor control configuration based on the rectangular-wave control in the case where the phase ϕv of the voltage applied to the motor is directly controlled.

Referring to FIG. 11, the rectangular-wave control unit 400 includes a power computation unit 410, a torque computation unit 420, a PI computation unit 430, a rectangular wave generation unit 440, a signal generation unit 450, and a coordinate conversion unit 460.

The power computation unit 410 uses the following Equation (2) to calculate the power (motor power) Pmt supplied to the motor from the current of each phase found from the V-phase current iv and W-phase current iw obtained with the current sensor 24 and the voltages Vu, Vv, Vw of each phase (U phase, V phase, W phase).

$$Pmt = iu \times Vu + iv \times Vv + iw \times Vw \qquad (2)$$

The torque computation unit 420 calculates a torque estimated value Tq by the following Equation (3) from the motor power Pmt found by the power computation unit 410 and the angular speed ω calculated from the revolution angle θ of the AC motor M1 that is found with the revolution angle sensor 25.

$$Tq = Pmt/\omega \qquad (3)$$

The torque difference ΔTq (ΔTq=Trqcom−Tq) with the torque command value Trqcom is inputted to the PI computation unit 430. The PI computation unit 430 conducts PI computations with a predetermined gain with respect to the torque difference ΔTq, finds a control difference, and sets the phase ϕv of the rectangular-wave voltage correspondingly to the found control difference. More specifically, when a positive torque is generated (Trqcom>0), where the torque is insufficient, the voltage phase is advanced, and where the torque is excessive, the voltage phase is delayed. When a negative torque is generated (Trqcom<0), where the torque is insufficient, the voltage phase is delayed, and where the torque is excessive, the voltage phase is advanced.

The rectangular wave generation unit 440 generates voltage command values (rectangular wave pulses) Vu, Vv, Vw according to the voltage phase ϕv that has been set by the PI computation unit 430. The signal generation unit 450 generates the switching control signals S3 to S8 according to the voltage command values Vu, Vv, Vw of each phase. The inverter 14 conducts switching operations according to the switching control signals S3 to S8, whereby the rectangular wave pulses corresponding to the voltage phase ϕv are applied as voltages of each phase to the motor.

Thus, in the rectangular-wave control of the variation example, the motor torque control can be conducted by the torque (power) feedback control. However, in the rectangular-wave control, because a phase is the only operation parameter of the voltage applied to the motor, the control responsiveness is decreased by comparison with that of the PWM control in which the amplitude and phase of the voltage applied to the motor can be taken as the operation parameter. Further, when power computations (Equation (2)) are conducted in the power computation unit 410, a filter processing is executed in parallel to remove a distortion component from the detected motor currents (iv, iw).

By disposing a torque sensor instead of the power computation unit 410 and torque computation unit 420, it is also possible to find the torque difference ΔTq on the basis of the detected value of the torque sensor.

The coordinate conversion unit 460 conducts coordinate conversion (3 phases→2 phases) on the basis of the current of each phase found from the V-phase current iv and W-phase current iw obtained with the current sensor 24 and the revolution angle θ of the AC motor M1 and calculates the d-axis and q-axis current values Id, Iq. The coordinate conversion unit 460 outputs the d-axis and q-axis current values Id, Iq to the current storage unit 495. Where the coordinate conversion unit 220 of the PWM control unit 200 is also caused to operate when the rectangular-wave control is executed, the coordinate conversion unit 460 can be omitted.

In this variation example, the current storage unit 495 shown in FIG. 4 stores the final values of the d-axis and q-axis current values Id, Iq as final current states (Idfbk, Iqfbk) in the rectangular-wave control when the switching signal TRG is inputted from the control mode selection unit 490. The current storage unit 495 outputs the final current states Idfbk, Iqfbk that have been stored to the PWM control unit 200.

Figure 15:
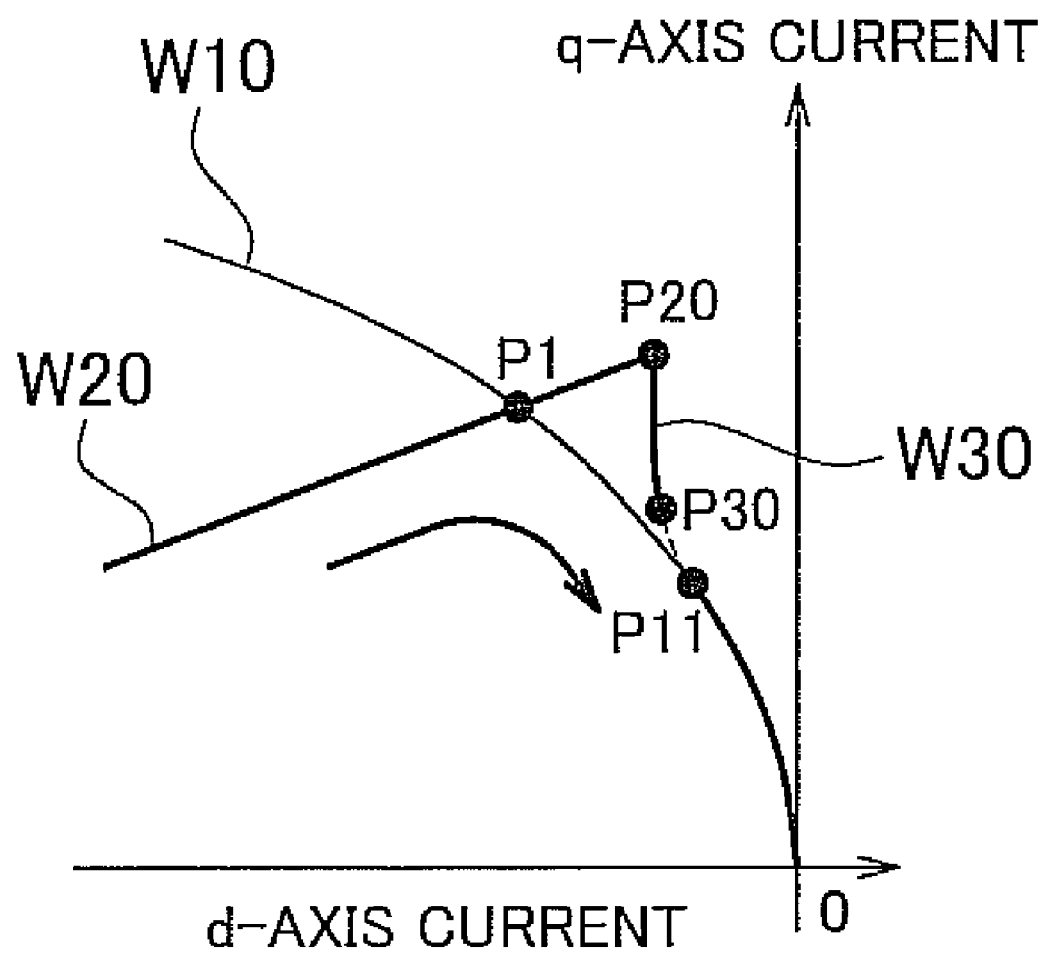
FIG. 15 is a schematic diagram illustrating the variations of d-axis and q-axis current command values on the d-q axes plane in Embodiment 3.

In the case of this variation example, in a flowchart of switching between the rectangular-wave control and the PWM control that is shown in FIG. 5, the switching determination can be performed by using the phase φi of the motor current values Id and Iq instead of the phase φi# of the current command in step S13 shown in FIG. 15. In this case, the control mode selection unit 490 calculates the d-axis current value Id and q-axis current value Iq by conducting coordinate conversion (3 phases→2 phases) of the currents of each phase calculated on the basis of the V-phase current iv and W-phase current iw detected with the current sensor 24 by using the revolution angle θ of the AC motor M1 detected by the revolution angle sensor 25. The current phase φi is then calculated from the d-axis and q-axis current values Id, Iq.

In the variation example of Embodiment 1, the configuration of the PWM controller 200 shown in FIG. 9 is similar to that in Embodiment 1, except for a portion that is configured to replace the final current command values Idref# and Iqref# in the rectangular-wave control that are inputted from the current storage unit 495 to the command correction unit 270 with the final current values Idfbk, Iqfbk in the rectangular-wave control immediately prior to switching.

Thus, the smoothing processing of the current command values in the command correction unit 270 is conducted by taking the final current values Idfbk, Iqfbk in the rectangular-wave control immediately prior to switching as the initial values and smoothing the variations of the current command values Idcom, Iqcom in the PWM control after the switching in the direction of time axis.

Figure 12:
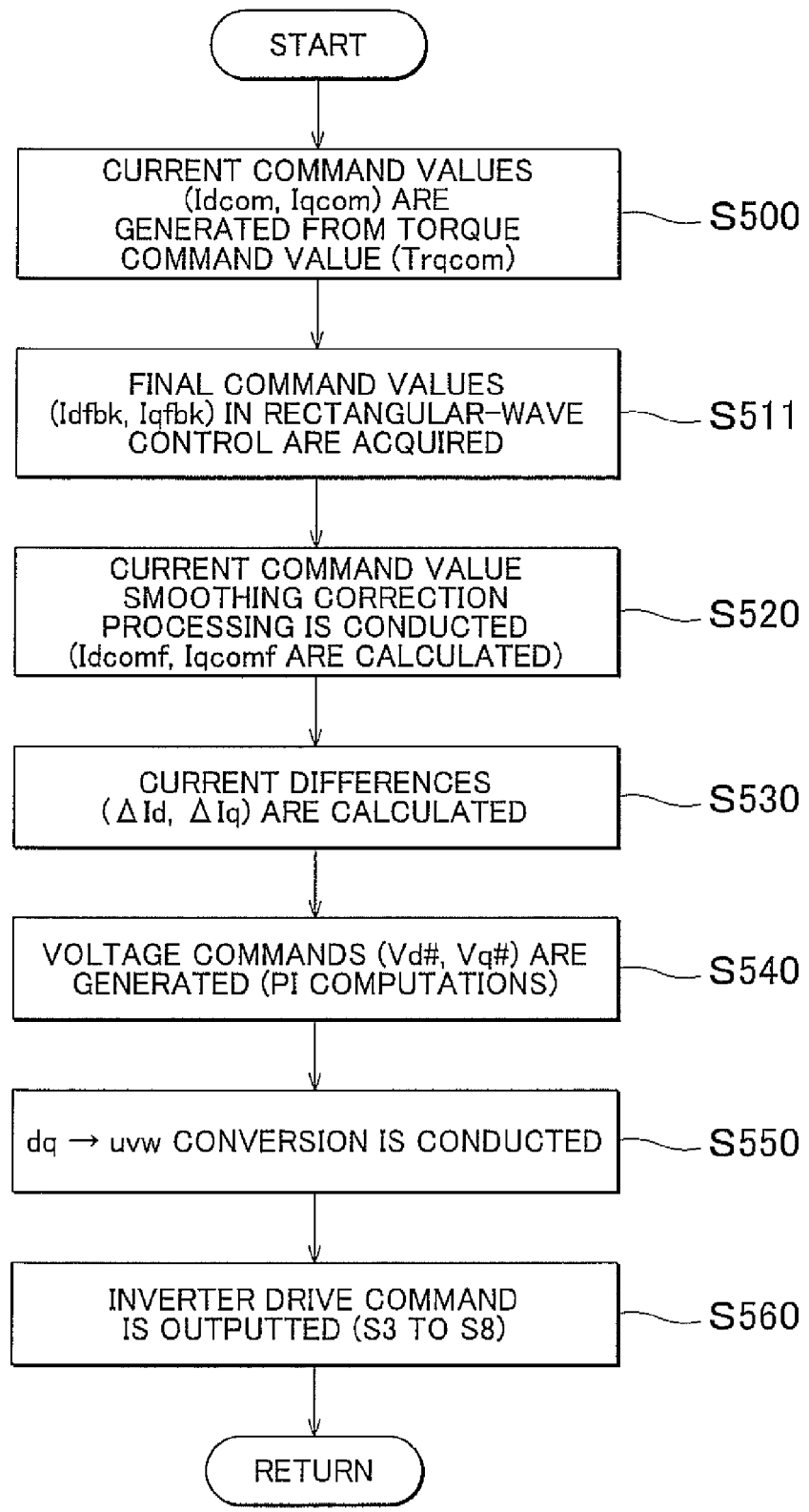
FIG. 12 is a flowchart illustrating a control processing sequence of the current command correction control in the variation example of Embodiment 1.

The control processing procedure of the current command correction control in the variation example of Embodiment 1 will be explained below using the flowchart shown in FIG. 12. The flowchart shown in FIG. 12 is obtained by replacing S510 in the flowchart shown in FIG. 10 and relating to Embodiment 1 with S511. Steps that duplicate those in FIG. 10 will not be redundantly explained.

Referring to FIG. 12, in S500, the controller 30 generates the d-axis current command value Idcom and q-axis current command value Iqcom from the torque command value Trqcom of the AC motor M1 according to a table that has been created in advance. The controller 30 then acquires the final motor current values Idfbk, Iqfbk in the rectangular-wave control from the current storage unit 495 in S511.

Then, in S520, the controller 30 calculates the d-axis current command value Idcomf after the correction by conducting the smoothing processing on the basis of the d-axis current command value Idcom generated in S500 and the d-axis final current value Idfbk in the rectangular-wave control that has been acquired in S511. The q-axis current command value Iqcomf after the correction is similarly calculated with respect to the q axis (S520).

The processing of steps S530 to S560 is then performed similarly to Embodiment 1 and drive commands S3 to S8 are outputted to the inverter 14.

With such a configuration, it is possible to generate a current command in the PWM control that can ensure continuity from the actual motor current in the rectangular-wave control immediately prior to switching even in a case where no current command is used in the rectangular-wave control. Therefore, the increase in current difference during switching from the rectangular-wave control to the PWM control can be prevented and control stability can be improved.

Embodiment 2 will be explained below. In the current command correction control of Embodiment 1 and the variation example thereof, the technique is explained by which the d-axis and q-axis current command values are smoothed in the PWM control. In this case, it is possible that a case will occur in which the current command values Idcomf, Iqcomf will make it impossible to output the target torque and the torque can fluctuate instantaneously. In the case of electric vehicle such as described in Embodiment 1, such torque fluctuations will create a sense of discomfort (torque shock or the like) in the vehicle occupants.

Accordingly, in Embodiment 2, a technique will be described by which the smoothing processing is conducted only with respect to one current command value from among the d-axis and q-axis current command values, and the other current command value is calculated from the equation representing the relationship between the output torque and the d-axis and q-axis current command values. With such a configuration, it is possible to ensure the continuity of the current command values and also to ensure the target torque.

The torque T and the d-axis and q-axis current command values Id, Iq generally satisfy the relationship represented by Equation (4) below.

$$T = N\{(Ld-Lq) \times Id + \Phi\} \times Iq \tag{4}$$

N: a pair of poles;
Ld: d-axis impedance;
Lq: q-axis impedance; and
Φ: magnetic flux of permanent magnet.

Here, the pair of poles N, d-axis and q-axis impedances Ld, Lq, and magnetic flux Φ of permanent magnet are motor constants of the AC motor M1 and are set correspondingly to the motor state with a map that has been created in advance.

By transforming the Equation (4), it is possible to represent the d-axis current Id and q-axis current Iq with the following Equations (5) and (6), respectively.

$$Id = \{(T/(N \times Iq)) - \Phi\}/(Ld-Lq) \tag{5}$$

$$Iq = T/\{N \times \{(Ld-Lq) \times Id + \Phi\}\} \tag{6}$$

Therefore, it is possible to calculate one from the d-axis and q-axis current command values immediately after switching from the rectangular-wave control to the PWM control by conducting smoothing processing similar to that in Embodiment 1 in the command correction unit 270 shown in FIG. 9 and calculate the other current command value from the relationships represented by Equation (5) or (6) by using the torque command value Trqcom. As a result, it is possible to calculate the d-axis or q-axis current command values such that ensure the target torque command value Trqcom.

Figure 13:
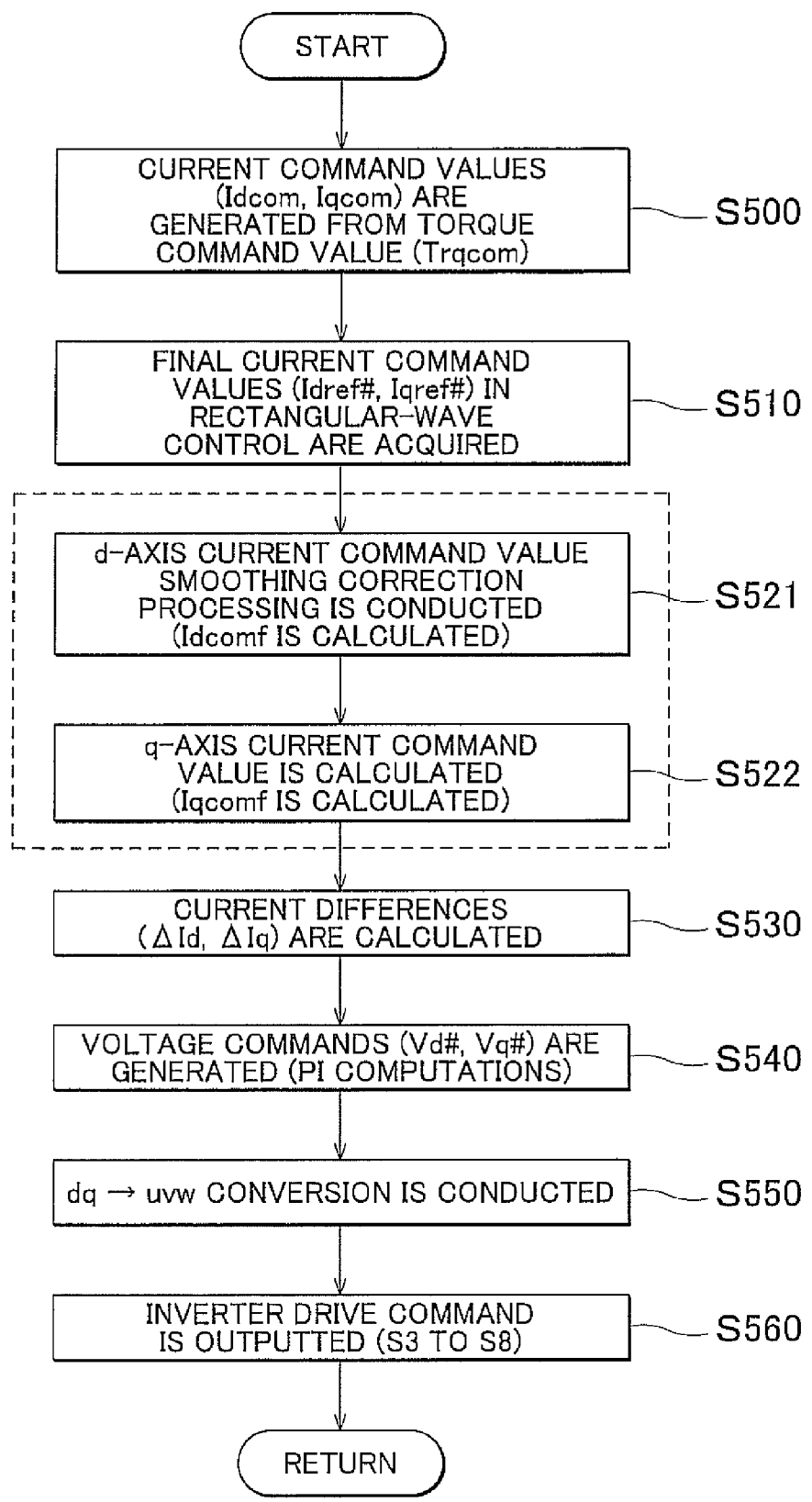
FIG. 13 is a flowchart illustrating a control processing sequence of the current command correction control in Embodiment 2.

FIG. 13 shows a flowchart relating to a case in which the d-axis current command value is calculated by the smoothing processing and the q-axis current command value is calculated by computations using the aforementioned relationships.

In FIG. 13, step S520 of the flowchart shown in FIG. 10 and used in Embodiment 1 is replaced with steps S521 and S522. The steps that duplicate those shown in FIG. 10 will not be redundantly explained herein.

Referring to FIG. 13, in S521, the controller 30 takes the d-axis final current command value Idref# acquired in S510 as the final value and calculates the d-axis current command value Idcomf after the correction by conducting smoothing processing of the d-axis current command value Idcom in the PWM control.

Then, in S522, the controller 30 calculates the q-axis current command value Iqcomf by Equation (6) shown above by using the torque command value Trqcom and the d-axis current command value Idcomf after the correction that has been calculated in S521.

The processing of steps S530 to S560 is then conducted in the same manner as explained with reference to FIG. 10 in Embodiment 1 and drive commands S3 to S8 are outputted to the inverter 14.

Figure 14:
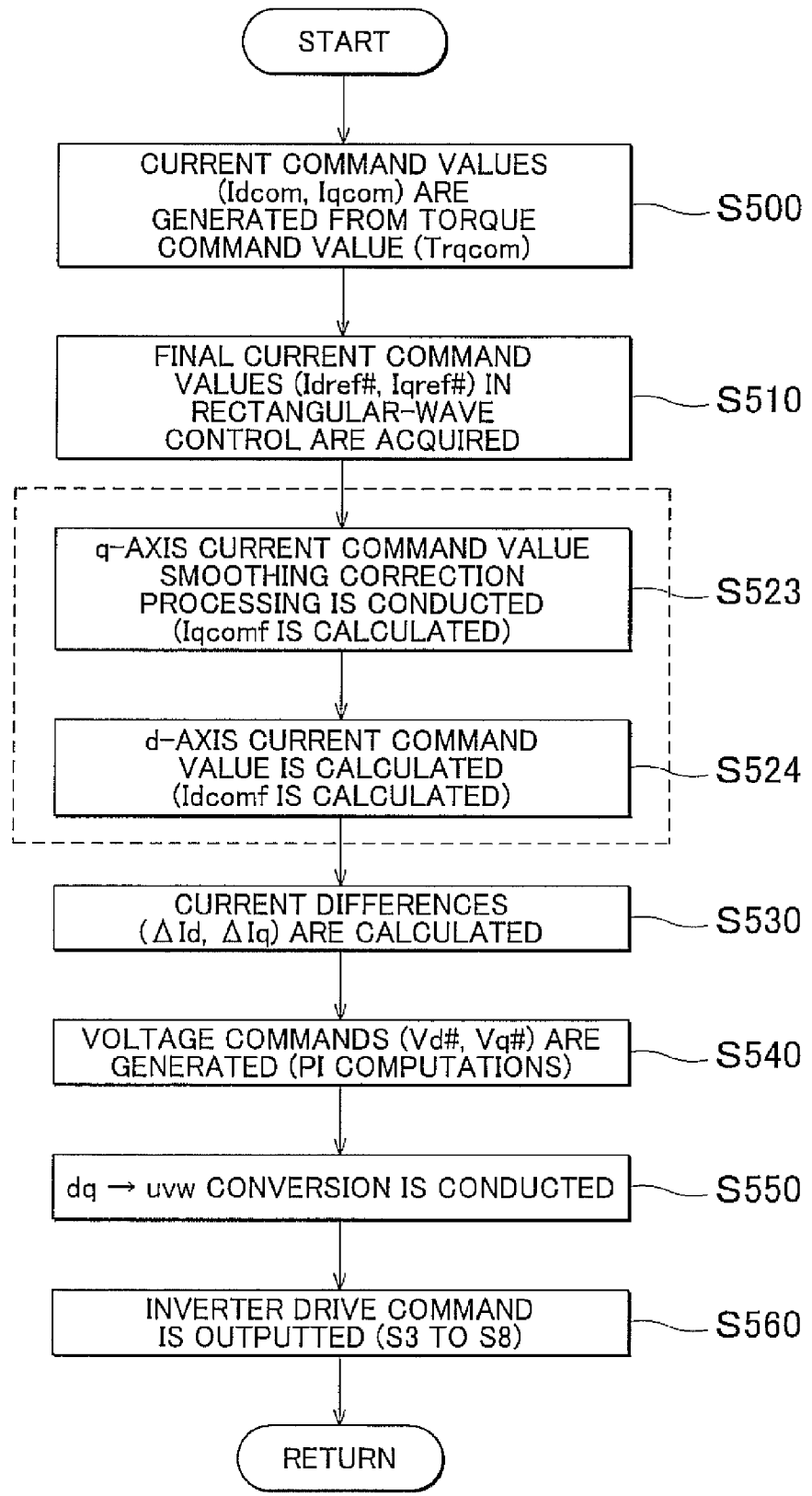
FIG. 14 is a flowchart illustrating a control processing sequence of the current command correction control in Embodiment 2.

FIG. 14 shows a flowchart relating to a case in which the q-axis current command value is calculated by the smoothing processing and the d-axis current command value is calculated by computations using the relationship described above.

In FIG. 14, steps S521 and S522 of the flowchart shown in FIG. 13 are replaced with steps S523 and S525. The steps that duplicate those shown in FIG. 13 will not be redundantly explained herein.

Referring to FIG. 14, in S523, the controller 30 calculates the q-axis current command value Iqcomf after the correction by conducting smoothing processing of the q-axis current command value Iqcom in the PWM control on the basis of the q-axis final current command value Iqref# acquired in S510.

Then, in S524, the controller 30 calculates the d-axis current command value Idcomf by Equation (5) shown above by using the torque command value Trqcom and the q-axis current command value Iqcomf after the correction that has been calculated in S523.

The processing of steps S530 to S560 is then conducted and the drive commands S3 to S8 are outputted to the inverter 14.

By conducting the above-described processing, it is possible to ensure the continuity of the current command and output the target torque.

The variation example of Embodiment 1 can be also applied to the above-described processing. Thus, a similar configuration can be realized by replacing step S520 in FIG. 12 of the variation example of Embodiment 1 with S521 and S522, or S523 and S524 in the same manner as described above.

Embodiment 3 will be explained below. In the current command correction control in the PWM control in Embodiments 1 and 2, the current command values Idcomf, Iqcomf after the correction essentially follow at all times the Idcom, Iqcom, which are the original current command values, with the passage of time. However, due to fluctuations of vehicle state or motor constants in the course of the current command control, it is possible that the current command values Idcomf, Iqcomf after the correction will be unable to follow the Idcom, Iqcom, which are the original current command values, at all times. In such a state, the aforementioned current command line cannot be followed and therefore the operation in a state with poor efficiency will be maintained.

Accordingly, in Embodiment 3, a technique will be explained by which the decrease in efficiency is inhibited by returning to the original current command in a case where the difference in current commands between a state before the correction and a state after the correction is equal to or less a predetermined reference value in the current command correction control described in Embodiments 1 and 2.

FIG. 15 is a schematic diagram illustrating variations in the d-axis and q-axis current on the d-q axes plane in Embodiment 3. By applying the current command correction control based on the technique similar to that of Embodiments 1 or 2, the current command after the correction is changed from P20 in the figure, which is the final current command of the rectangular-wave control, along the W30, and the present current command is made P30. Where the difference between the current command P30 after the correction and the original current command P11 on the d-q axes plane, that is, the distance therebetween, is equal to or less than a predetermined reference value, the current command correction control is stopped and the current command P30 after the correction is forcibly returned to the original current command P11.

The aforementioned predetermined reference value is preferably set on the basis of a distance such that no overcurrent or the like occurs even when the current command after the correction is switched to the original current command.

Figure 16:
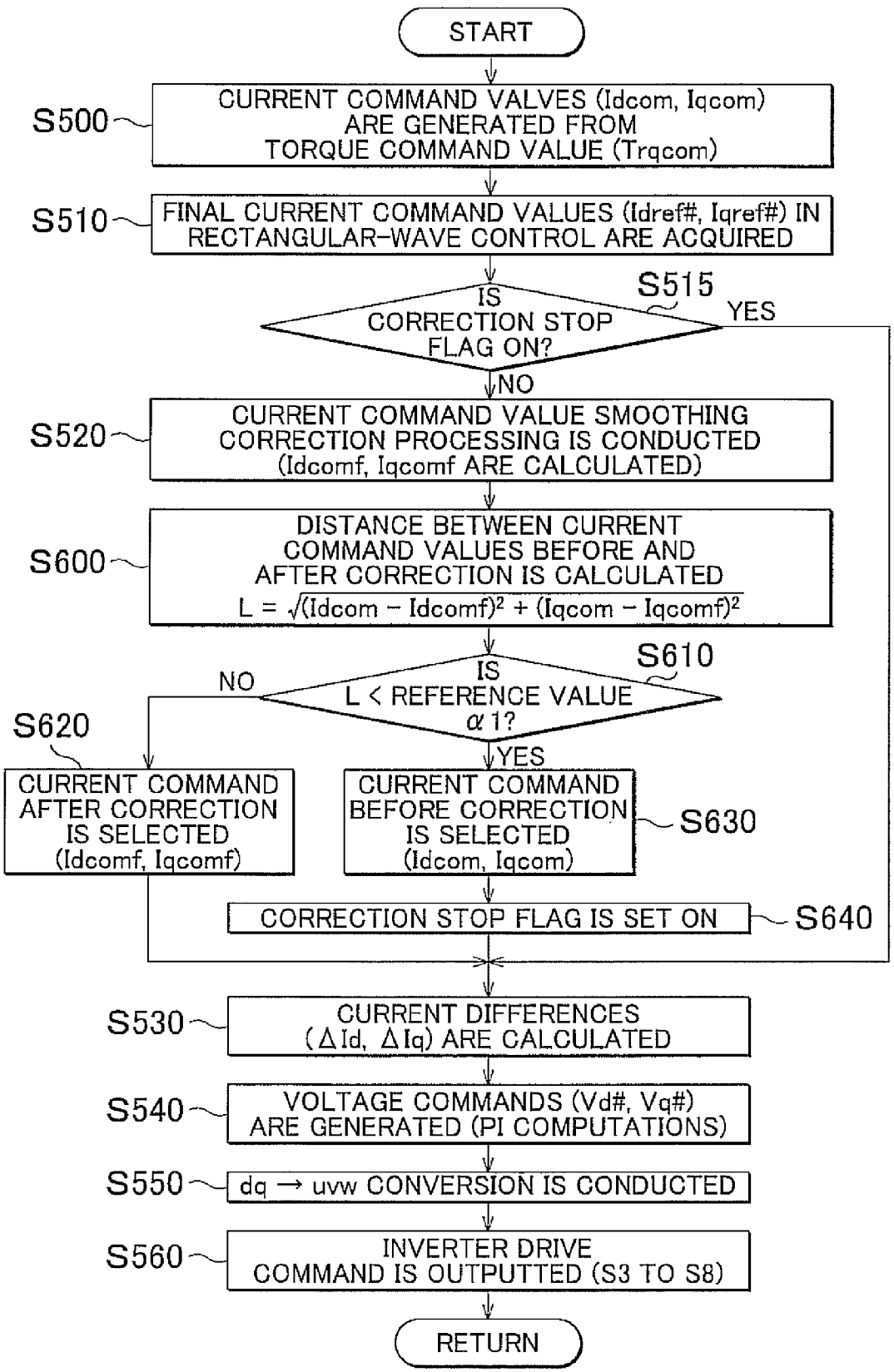
FIG. 16 is a flowchart illustrating a control processing sequence of stop processing of the current command correction control in Embodiment 3.

FIG. 16 shows a flowchart relating to a case in which the current command correction control is stopped on the basis of comparison of the current command before the correction with that after the correction in Embodiment 3.

In FIG. 16, steps S515 and S600 to S640 are added to the flowchart shown in FIG. 10 and relating to Embodiment 1. Steps that duplicate those in FIG. 10 will not be redundantly explained.

Referring to FIG. 16, in S510, the controller 30 acquires the final current command values Idref#, Iqref# in the rectangular-wave control from the current storage unit 495. Then, the controller 30 determines in S515 whether a correction stop flag FLG is ON.

Where the correction stop flag FLG is ON (YES in S515), the controller 30 skips the processing of S520 and S600 to S640 and then makes a transition to the processing of S530. A drive command is then outputted to the inverter 14 by conducting processing of steps S530 to S560 by using the original current command values Idcom, Iqcom.

Where the correction stop flag FLG is OFF (NO in S515), the controller 30 in S520 conducts a smoothing processing similar to that of Embodiment 1 with respect to the current command values Idcom, Iqcom.

A transition is then made to the processing of S600, and a distance L between the current commands before and after the correction on the d-q axes plane is calculated by Equation (7).

$$L = \{(Idcom - Idcomf)^2 + (Iqcom - Iqcomf)^2\}^{1/2} \quad (7)$$

Then, in S610, it is determined whether the distance L calculated in S600 is less than a predetermined reference value α1, that is, whether the current command after the correction has come close to the original current command.

In a case where the distance L is equal to or greater than the reference value α1 (NO in S610), it is determined that the current command after the correction has not come close to the original current command, the processing flow advances to S620, and the current command values Idcomf, Iqcomf after the correction are selected. The processing flow then moves to S530 and the processing of S530 to S560 is executed by using the current command values Idcomf, Iqcomf after the correction.

Where the distance L is less than the reference value α1 (YES in S610), it is determined that the current command after the correction has come close to the original current command, and the original current command values Idcom, Iqcom before the correction are selected in S630. As a result, the current command in the PWM control is returned to the original current command before the correction.

The processing flow then moves to S640, and the controller 30 sets ON the correction stop flag FLG. As a result, the correction of current command is stopped by the determination in the above-described step S515 in the next and subsequent control periods.

The processing of S530 to S560 is then executed by using the current command values Idcom, Iqcom, and the inverter drive commands S3 to S8 are outputted.

By conducting such a processing, it is possible to return forcibly the current command after the correction to the original current command when the current command after the correction has come close to the original current command.

The correction stop flag FLG is reset and switched OFF when switching is conducted from the PWM control to the rectangular-wave control (this is not shown in the figure).

A similar feature can be also applied to the variation example of Embodiment 1 and Embodiment 2. Thus, a similar configuration can be realized by replacing S510 with S511 and replacing S520 with S521 and S522 or with S523 and S524.

A variation example of Embodiment 3 will be explained below. Embodiment 3 describes a method for returning to the original current command on the basis of a distance between the current command before the correction and that after the correction on the d-q axes plane.

However, where fluctuations of motor constants are even greater, it can be impossible to return to the original command value even by performing the determination based on the distance between the current command before the correction and that after the correction on the d-q axes plane. In particular, the possibility of such an event is increased under the effect of fluctuations of motor constants or the like in a case where one current command value is calculated by a mathematical formula as in Embodiment 2.

The current command value corrected by smoothing always follows the original current command value with the passage of time. Accordingly, the variation example of Embodiment 3 describes a technique by which when the difference in the current command values before and after the correction is equal to or less than a predetermined reference value for the current command value corrected by smoothing, from among the d-axis and q-axis current command values, the controller 30 stops the current command correction control and causes the return to the original current command values.

Figure 17:
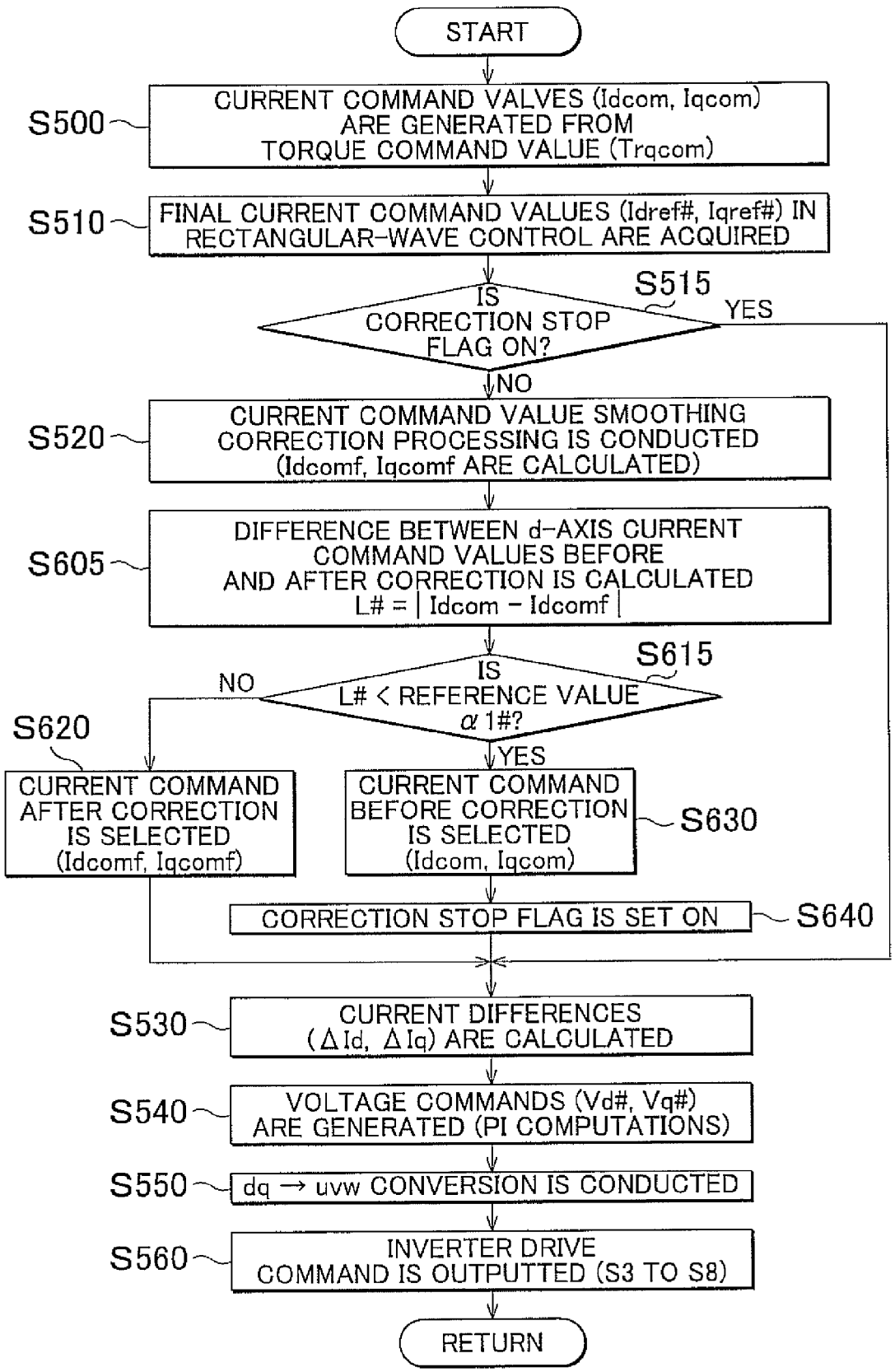
FIG. 17 is a flowchart illustrating a control processing sequence of stop processing of the current command correction control in Embodiment 3.

FIG. 17 shows a flowchart of control in the variation example of Embodiment 3. In the flowchart shown in FIG. 17, steps S600 and S610 of the flowchart of Embodiment 3 shown in FIG. 16 are replaced with S605 and S615. FIG. 17 illustrates a case in which the determination is performed based on the difference in the d-axis current command value when the d-axis current command value is smoothed. Steps that duplicate those in FIG. 16 will not be redundantly explained.

Referring to FIG. 17, the controller 30 performs the smoothing processing of current command values in S520 and calculates the current command values Idcomf, Iqcomf after the correction.

Then, in S605, the controller 30 calculates a difference L# (=|Idcom−Idcomf|) in the current command between the d-axis current command value Idcomf after the correction and the original d-axis current command value Idcom before the correction.

Then, in S615, the controller 30 determines whether the difference L# in the current command that has been calculated in S605 is less than a predetermined reference value α1#.

Where the difference L# in the current command is equal to or greater than the predetermined reference value α1# (NO in S615), the processing flow advances to S620, and a current command after the correction is selected. Where the difference L# in the current command is less than the predetermined reference value α1# (YES in S615), the processing flow advances to S630 and the original current command before the correction is selected. Subsequent processing is similar to that shown in FIG. 16.

With such a configuration, when the d-axis current command value before the correction is close to that after the correction, the current command correction control can be stopped and the current command can be returned to the original current command.

In the explanation above, when the d-axis current command value is smoothed, the determination is made based on the difference in current command between the d-axis current command values before and after the correction, but when the q-axis current command value is smoothed, the determination is made in S605 based on the difference in current command between the q-axis current command values before and after the correction.

As for the case in which smoothing is conducted with respect to both the d-axis current value and the q-axis current value, either of the d axis or q axis may be selected for determination, as described hereinabove, or the determination may be made with respect to both the d axis and the q axis.

Further, a similar configuration can be also applied to the variation example of Embodiment 1 and Embodiment 2 by appropriately replacing S510 and S520 in the flowchart shown in FIG. 17.

The reference value α1# that is used to determine the difference L# in current commands may be set to different values in a case in which the determination is made with the d-axis current command value and a case in which the determination is made with the q-axis current command value.

Embodiment 4 will be explained below. As described hereinabove, the object of the current command correction control of Embodiments 1 to 3 and variation examples thereof is to inhibit abrupt variations in current commands by conducting smoothing processing of the current commands. As a result, where such a current command correction control is applied, the process of following the original current command can be delayed with respect to that in the case in which no such control is applied.

Therefore, in a case in which the difference between the actual motor current at the time of switching from the rectangular-wave control to the PWM control and the current command in the PWM control is large and the motor current is disturbed, where such a current command correction control is applied, the correction of current disturbance is delayed and therefore controllability of the motor can be degraded.

Accordingly, in Embodiment 4, a technique is described according to which when the degree of separation between the actual motor current and the original current command in the PWM control is large at the time of switching from the rectangular-wave control to the PWM control, the controllability of the motor is improved by rapidly correcting the disturbance of motor current by the usual current feedback control, without applying the current command correction control.

Figure 18:
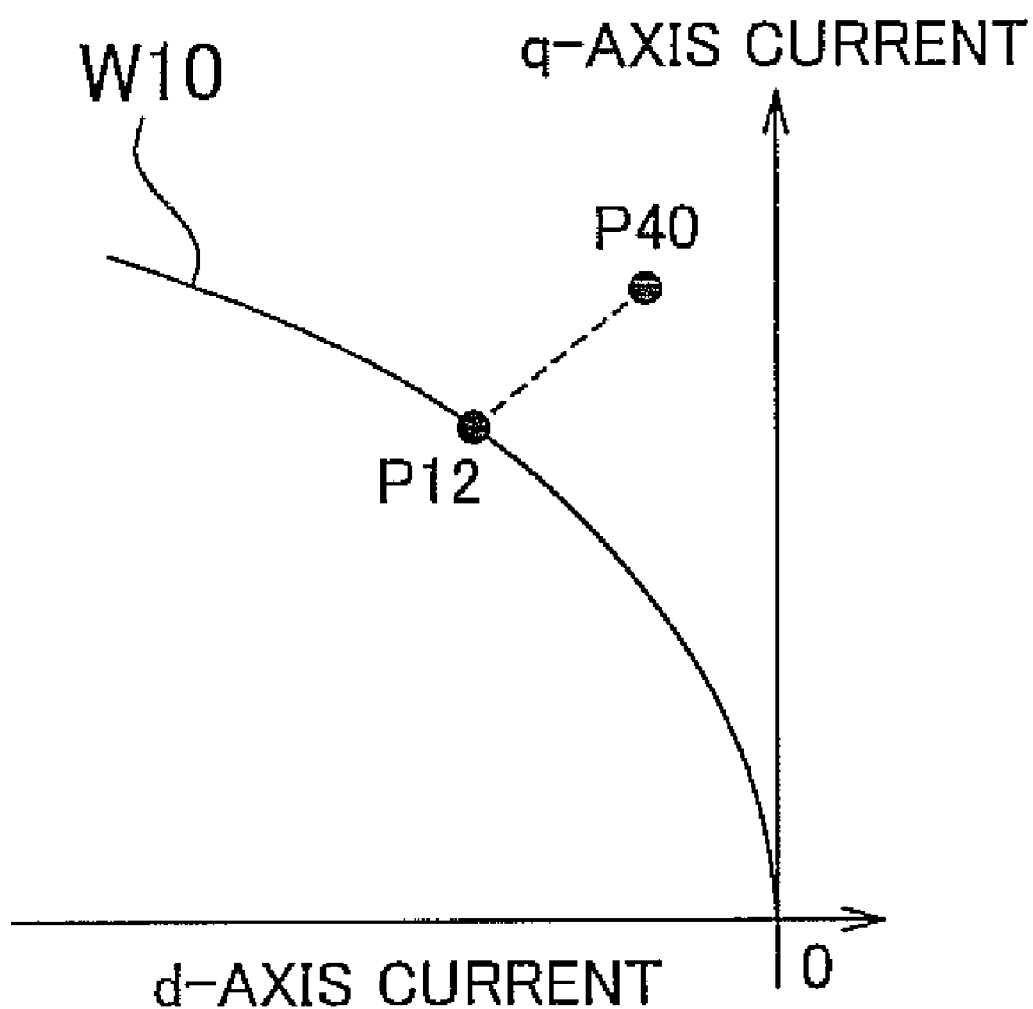
FIG. 18 is a schematic diagram of stop processing of the current command correction control in Embodiment 4.

FIG. 18 shows schematically the stop processing of the current command correction control in Embodiment 4. FIG. 18 shows a current in the d-q axes plane at the time of switching from the rectangular-wave control to the PWM control. In the figure, P12 shows a current command in the PWM control during switching, and P40 shows the actual motor current during switching.

When the distance (difference in current) between the aforementioned current command P12 and motor current P40 on the d-q axes plane is calculated and this distance is equal to or greater than a predetermined reference value α2, the application of the current command correction control is stopped, the original current command (P12) is selected, and drive commands S3 to S8 to the inverter 14 are generated.

With such a configuration, when the difference (disturbance) of motor current at the time of switching from the rectangular-wave control to the PWM control is large, the disturbance of motor current can be rapidly corrected by stopping the application of the current command correction control.

Figure 19:
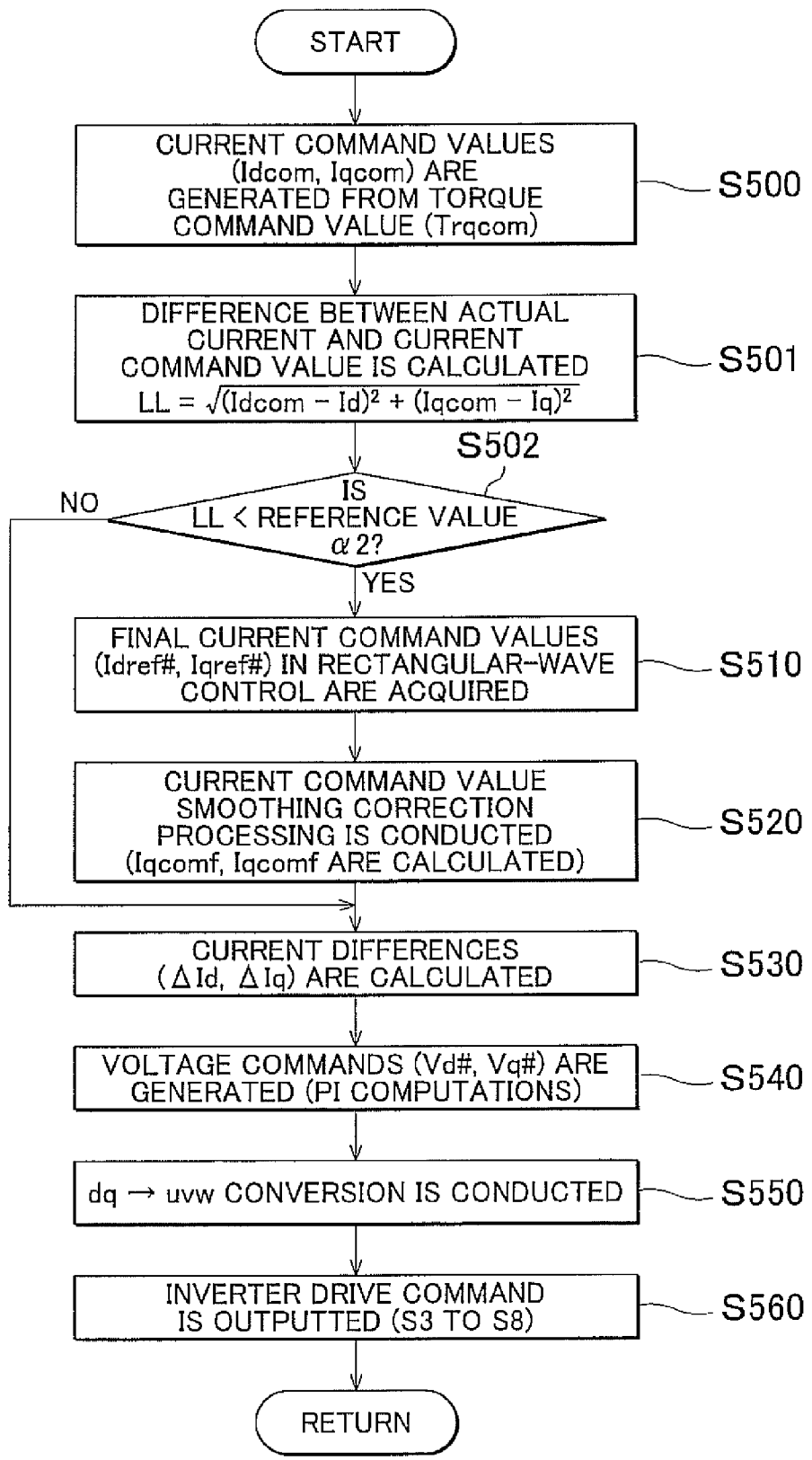
FIG. 19 is a flowchart illustrating a control processing sequence of correction control stop processing in Embodiment 4.

FIG. 19 is a flowchart showing the correction control stop processing in Embodiment 4. The flowchart shown in FIG. 19 is obtained by adding steps S501 and S502 to the flowchart of Embodiment 1 shown in FIG. 10. Steps that duplicate those in FIG. 10 will not be redundantly explained.

Referring to FIG. 19, in S501, the controller 30 uses Equation (8) to calculate a distance LL, which is a difference in current on the d-q axes plane, from the current command values Idcom, Iqcom generated in S500 and actual motor current values Id, Iq at this time.

$$LL=\{(Idcom-Id)^2+(Iqcom-Iq)^2\}^{1/2} \qquad (8)$$

Then, in S502, the controller 30 determines whether the distance LL is less than the predetermined reference value $\alpha 2$.

In a case where the distance LL is less than the predetermined reference value $\alpha 2$ (YES in S502), the controller 30 executes the correction processing of the current command in the same manner as in Embodiment 1 by executing the processing of subsequent steps S510 to S560 and generates and outputs the drive command to the inverter 14.

Where the distance LL is equal to or greater than the predetermined reference value $\alpha 2$ (NO in S502), the correction processing of current commands of S510 and S520 is skipped and the processing flow advances to S530. The processing of S530 to S560 is then executed by using the original current command values Idcom, Iqcom.

Where such a processing is executed, when the disturbance of motor current at the time of switching from the rectangular-wave control to the PWM control is large, the disturbance or motor current can be rapidly corrected and motor controllability can be improved by stopping the application of the current command correction control.

Further, a similar configuration can be also applied to Embodiments 1 to 3 and variation examples thereof by appropriately replacing steps S510 and S520 in the flowchart shown in FIG. 19.

Embodiment 5 will be explained below. In a case where a synchronous electric motor of a permanent magnet type is used as the AC motor M1, the magnetic field cannot be varied because permanent magnets are used. Therefore, the d-axis current control value is generally controlled to zero or a negative region by a field weak control.

Therefore, in a case where the d-axis current value Id of the actual motor current is in a positive region, from the standpoint of motor controllability, it is necessary to return the d-axis current rapidly to zero or a negative region. For this reason, in a case where the d-axis current value Id is in a positive region even at the time of switching from the rectangular-wave control to the PWM control, it is necessary first of all to restore the d-axis current value.

Accordingly, in Embodiment 5, a technique is described by which when the d-axis current value Id of the actual motor current is larger than a predetermined reference value $\alpha 3$ (more specifically, when Id is positive) at the time of switching from the rectangular-wave control to the PWM control, the d-axis current command value is rapidly returned to zero or a negative region by stopping the application of the current command correction control.

Figure 20:
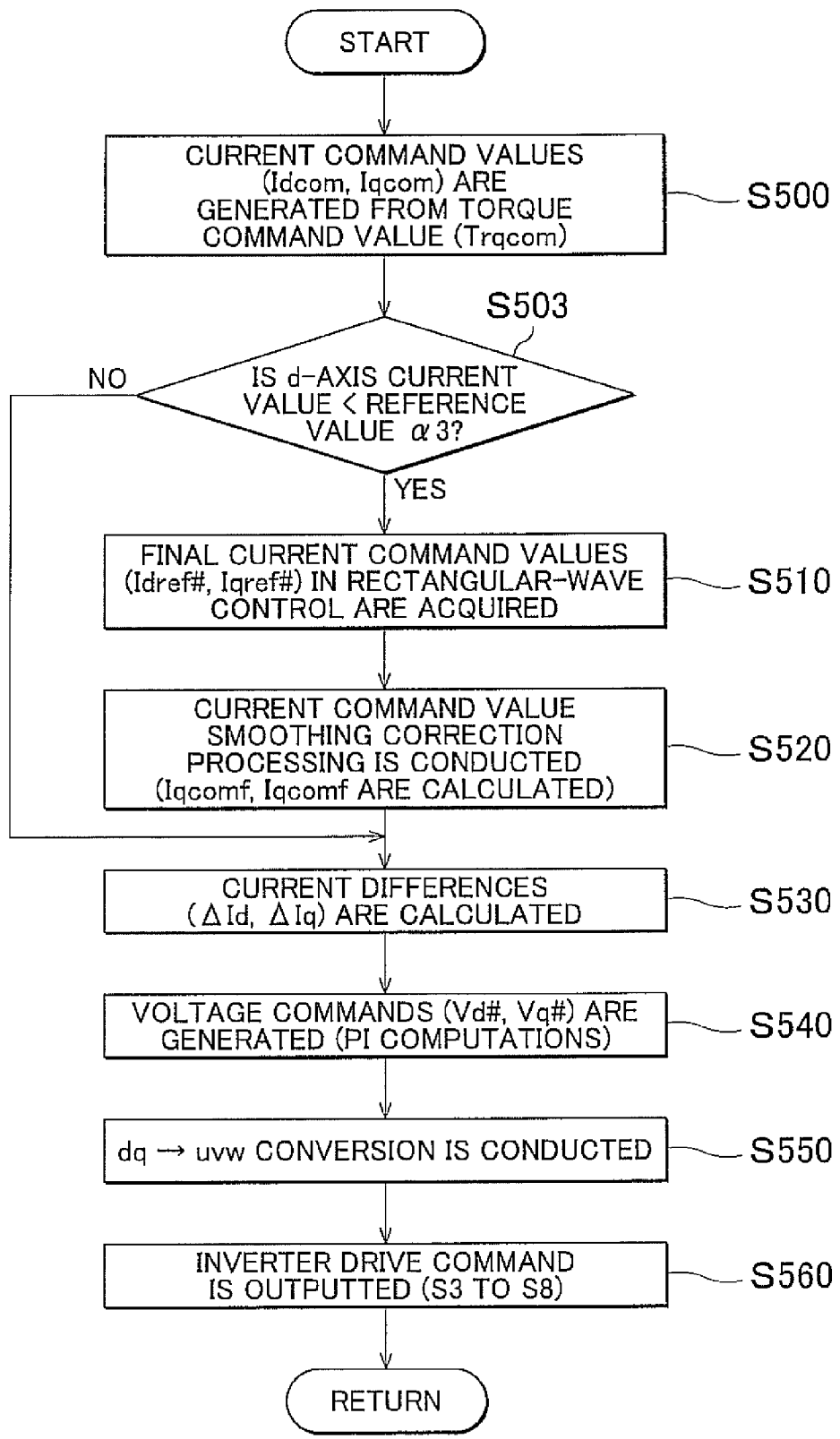
FIG. 20 is a flowchart illustrating a control processing sequence of correction control stop processing in Embodiment 5.

FIG. 20 is a flowchart showing the correction control stop processing in Embodiment 5. The flowchart shown in FIG. 20 is obtained by adding step S503 to the flowchart of Embodiment 1 shown in FIG. 10. Steps that duplicate those in FIG. 10 will not be redundantly explained.

Referring to FIG. 20, in S500, the controller 30 generates the current command values Idcom, Iqcom from the torque command value Trqcom. Then, in S503, the controller 30 determines whether the d-axis current value Id of motor current is equal to or less than the predetermined reference value $\alpha 3$. The predetermined reference value used in S503 is preferably zero or a value almost equal to zero.

Where the d-axis current value Id is equal to or less than the predetermined reference value $\alpha 3$ (YES in S503), the processing flow advances to S510 and the correction processing of current command is performed and a drive command is outputted to the inverter 14 by conducting the processing of S510 to S560 in the same manner as in Embodiment 1.

Where the d-axis current value Id is greater than the predetermined reference value $\alpha 3$ (NO in S503), the correction processing of current commands of S510 and S520 is skipped and the processing flow advances to S530. The processing of S530 to S560 is then executed by using the original current command values Idcom, Iqcom.

With such a processing, in a case in which the d-axis current value Id is in a positive region at the time of switching from the rectangular-wave control to the PWM control, the d-axis current command value can be rapidly corrected to zero or a negative region by a current feedback control by stopping the application of the current command correction control. Therefore, motor controllability can be improved.

The PWM control unit in the embodiments is an example of "the PWM control unit" in accordance with the invention. The current commands (Idcom, Iqcom) in the PWM control are examples of "the first current commands" in accordance with the invention. The current commands after smoothing (Idcomf, Iqcomf) are examples of "the second current commands" in accordance with the invention. The current commands (Id#, Iq#) in the rectangular-wave control are examples of "the third current commands" in accordance with the invention. The predetermined reference values $\alpha 1$ and $\alpha 1\#$ in the embodiments are examples of "the first reference values" in accordance with the invention. The reference values $\alpha 2$, $\alpha 3$ are examples of "the second reference value" and "third reference value", respectively, in accordance with the invention.

In the embodiments, an electric vehicle is explained that carries a motor drive control system employing the controller of the AC motor, but the invention is not limited to such a configuration, and any system including an AC motor that can be driven by the motor drive control system can be applied.

In the above-described functional block diagrams and flowcharts, not all of the described functional blocks and steps are always necessary, and it can be assuredly stated that, if necessary, some of the functional blocks and steps can be omitted.

While the invention has been described with reference to the example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single elements, are also within the scope of the invention.

What is claimed is:

1. A controller for a motor drive control system provided with an inverter, an alternating current motor that has an applied voltage controlled by the inverter, and a current detector that detects a motor current flowing between the inverter and the alternating current motor, the controller comprising:
a rectangular-wave control unit that is configured to generate a control command of the inverter according to a rectangular-wave control that controls a voltage phase of a rectangular-wave voltage applied to the alternating current motor, so as to cause the alternating current motor to operate according to an operation command;
a pulse width modulation control unit that is configured to generate a control command of the inverter by a pulse width modulation control based on comparison of a carrier wave with an alternating voltage command for causing the alternating current motor to operate according to the operation command;
a control mode selection unit that is configured to select either control mode from among the rectangular-wave control and the pulse width modulation control in accordance with an operation state of the alternating current motor; and
a current storage unit that is configured to store the final current state immediately before switching in the rectangular-wave control when the control mode is switched from the rectangular-wave control to the pulse width modulation control by the control mode selection unit, wherein
the pulse width modulation control unit includes:
a current command generation unit that is configured to generate a first current command according to the operation command in the pulse width modulation control;
a command correction unit that is configured to take the final current state stored in the current storage unit as an initial value during switching of the control mode from the rectangular-wave control to the pulse width modulation control, and generate a second current command by correcting the first current command so as to smooth variations in a time axis direction; and
a feedback control unit that is configured to generate the control command by the pulse width modulation control conducted according to a feedback control of the motor current based on the second current command.

2. The controller for a motor drive control system according to claim 1, wherein
the rectangular-wave control unit is configured to control the voltage phase by a feedback control of the motor current based on a third current command that reflects the operation command, and the current storage unit is configured to store the final current state on the basis of the final third current command immediately before the control mode switching in the rectangular-wave control.

3. The controller for a motor drive control system according to claim 2, wherein
the operation command is a torque command value, the first current command includes a first d-axis current command value and a first q-axis current command value, the second current command includes a second d-axis current command value and a second q-axis current command value, and the command correction unit performs smoothing with respect to one of the first d-axis current command value and the first q-axis current command value and calculates one of the second d-axis current command value and the second q-axis current command value on the basis of the other one of the second d-axis current command value and the second q-axis current command value, which are obtained by the smoothing, and the torque command value.

4. The controller for a motor drive control system according to claim 1, wherein
the current storage unit stores a current value as the final current state on the basis of the final motor current detected by the current detector immediately before the control mode switching in the rectangular-wave control.

5. The controller for a motor drive control system according to claim 4, wherein
the operation command is a torque command value, the first current command includes a first d-axis current command value and a first q-axis current command value, the second current command includes a second d-axis current command value and a second q-axis current command value, and the command correction unit performs smoothing with respect to one of the first d-axis current command value and the first q-axis current command value and calculates, on the basis of one of the second d-axis current command value and the second q-axis current command value, which are obtained by the smoothing, and the torque command value, the other one of the second d-axis current command value and the second q-axis current command value.

6. The controller for a motor drive control system according to claim 4, wherein
the motor current includes a d-axis current value and a q-axis current value, and the command correction unit stops the smoothing and matches the second current command with the first current command in a case where the d-axis current value at the time the control mode is switched from the rectangular-wave control to the pulse width modulation control is greater than a predetermined third reference value established from a controllability range of the alternating current motor.

7. The controller for a motor drive control system according to claim 1, wherein
the command correction unit stops the smoothing and matches the second current command with the first current command in a case where a difference in a current command between the first current command and the second current command on a d-q coordinate axes plane becomes equal to or less than a first reference value.

8. The controller for a motor drive control system according to claim 1, wherein
the command correction unit stops the smoothing and matches the second current command with the first current command in a case where a difference in a current between the motor current and the first current command on a d-q coordinate axes plane when the control mode is switched from the rectangular-wave control to the pulse width modulation control is greater than a predetermined second reference value.

* * * * *

UNITED STATES PATENT AND TRADEMARK OFFICE
CERTIFICATE OF CORRECTION

PATENT NO. : 8,264,181 B2
APPLICATION NO. : 12/685006
DATED : September 11, 2012
INVENTOR(S) : Toshifumi Yamakawa et al.

It is certified that error appears in the above-identified patent and that said Letters Patent is hereby corrected as shown below:

In the Specification

Column 8, line 22, Delete "51", Insert --S1--.

Column 8, line 36, Delete "51", Insert --S1--.

Signed and Sealed this
Thirtieth Day of September, 2014

Michelle K. Lee
*Deputy Director of the United States Patent and Trademark Office*